US012085799B2

(12) United States Patent
Fujikawa

(10) Patent No.: US 12,085,799 B2
(45) Date of Patent: Sep. 10, 2024

(54) ELECTRO-OPTICAL DEVICE AND ELECTRONIC APPARATUS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 89 days.

(21) Appl. No.: 18/082,850

(22) Filed: Dec. 16, 2022

(65) Prior Publication Data

US 2023/0123969 A1    Apr. 20, 2023

Related U.S. Application Data

(63) Continuation of application No. 17/747,376, filed on May 18, 2022, now Pat. No. 11,573,448, which is a
(Continued)

(30) Foreign Application Priority Data

May 23, 2018    (JP) ................. 2018-098506

(51) Int. Cl.
*G02F 1/1345*    (2006.01)
*G02F 1/1335*    (2006.01)
(Continued)

(52) U.S. Cl.
CPC ...... *G02F 1/133512* (2013.01); *G02F 1/1339* (2013.01); *G02F 1/13439* (2013.01);
(Continued)

(58) Field of Classification Search
CPC ......... G02F 1/133512; G02F 1/136209; G02F 1/13454; G02F 1/1339; G02F 1/1345;
(Continued)

(56) References Cited

U.S. PATENT DOCUMENTS 5,777,594 A    7/1998  Miyawaki
6,424,394 B1   7/2002  Morii
(Continued)

FOREIGN PATENT DOCUMENTS

JP    2000-089235 A    3/2000
JP    2002-156653 A    5/2002
(Continued)

OTHER PUBLICATIONS

Apr. 29, 2020 Office Action issued in U.S. Appl. No. 16/419,448.
(Continued)

*Primary Examiner* — Jessica M Merlin
(74) *Attorney, Agent, or Firm* — Oliff PLC

(57) ABSTRACT

In a liquid crystal device serving as an electro-optical device, a liquid crystal layer as an electro-optical element is disposed between a base material 10s as a first substrate and a base material 20s as a second substrate which are disposed to face each other via a photo-curable type seal material, the substrate 10s and the substrate 20s are transmissive and include a plurality of light-shielding patterns disposed at intervals in a seal region of the substrate 10s where the seal material is disposed, and on the substrate 10s, a semiconductor layer of a transistor included in a driving circuit for driving the electro-optical element is disposed to overlap, in plan view, with at least one of the plurality of light-shielding patterns.

7 Claims, 11 Drawing Sheets

Related U.S. Application Data continuation of application No. 17/243,920, filed on Apr. 29, 2021, now Pat. No. 11,366,352, which is a continuation of application No. 16/419,448, filed on May 22, 2019, now Pat. No. 11,022,833.

(51) Int. Cl.
  *G02F 1/1339* (2006.01)
  *G02F 1/1343* (2006.01)
  *G02F 1/1362* (2006.01)

(52) U.S. Cl.
  CPC ........ *G02F 1/1345* (2013.01); *G02F 1/13454* (2013.01); *G02F 1/136209* (2013.01)

(58) Field of Classification Search
  CPC .... G02F 1/13452; G02F 1/0107; G02F 1/161; G02F 1/1679; G02F 2202/28; G02F 1/13456; G02F 1/133458
  See application file for complete search history.

(56) References Cited

U.S. PATENT DOCUMENTS

| | | | |
|---|---|---|---|
| 11,022,833 | B2 | 6/2021 | Fujikawa |
| 2001/0048318 | A1 | 12/2001 | Matsueda |
| 2003/0098708 | A1 | 5/2003 | Matsueda |
| 2004/0245551 | A1 | 12/2004 | Murade |
| 2008/0123008 | A1 | 5/2008 | Yoshii |
| 2010/0253658 | A1 | 10/2010 | Tanaka et al. |
| 2011/0222003 | A1 | 9/2011 | Kinoe et al. |
| 2014/0118677 | A1 | 5/2014 | Kinoe et al. |
| 2015/0070639 | A1 | 3/2015 | Kinoe et al. |
| 2015/0277172 | A1 | 10/2015 | Sekine |
| 2015/0346535 | A1 | 12/2015 | Moriwaki |
| 2015/0370107 | A1 | 12/2015 | Kinoe et al. |
| 2016/0202534 | A1 | 7/2016 | Chen et al. |
| 2017/0261786 | A1 | 9/2017 | Kinoe et al. |
| 2018/0113547 | A1 | 4/2018 | Miyake et al. |
| 2019/0391436 | A1 | 12/2019 | Yoshida |

FOREIGN PATENT DOCUMENTS

| | | |
|---|---|---|
| JP | 2004-199082 A | 7/2004 |
| JP | 2004-354969 A | 12/2004 |
| JP | 2007-041346 A | 2/2007 |
| JP | 2007-072249 A | 3/2007 |
| JP | 4163812 B2 | 10/2008 |
| JP | 2011-191367 A | 9/2011 |
| JP | 2013-080041 A | 5/2013 |
| JP | 2018-073408 A | 5/2018 |
| WO | 2009/072336 A1 | 6/2009 |
| WO | 2018/155347 A1 | 8/2018 |

OTHER PUBLICATIONS

Oct. 20, 2020 Office Action issued in U.S. Appl. No. 16/419,448.
Feb. 12, 2021 Notice of Allowance issued in U.S. Appl. No. 16/419,448.

ELECTRO-OPTICAL DEVICE AND ELECTRONIC APPARATUS

CROSS-REFERENCE TO RELATED APPLICATION(S)

This application is a continuation of U.S. application Ser. No. 17/747,376 filed May 18, 2022, which is a continuation of U.S. application Ser. No. 17/243,920 filed Apr. 29, 2021, which is a continuation of U.S. application Ser. No. 16/419,448 filed May 22, 2019, which is based on, and claims priority from JP Application Serial Number 2018-098506, filed May, 23, 2018, the disclosures of which are hereby incorporated herein by reference in their entireties.

BACKGROUND

1. Technical Field

The present disclosure relates to an electro-optical device and an electronic apparatus.

2. Related Art

An example of an electro-optical device is an active drive type liquid crystal device including a transistor as a switching element in a pixel. In an active drive type liquid crystal device, in order to bond one substrate, on which the transistor is disposed, and another substrate including a light-shielding portion called a Black Matrix (BM), which defines an opening portion of the pixel, to be oppositely arranged with high positional accuracy, a photo-curable type seal material may be used in place of a thermosetting seal material. In order to cure the photo-curable type seal material sufficiently, it is preferable to radiate light from both sides of a pair of substrates. However, in the seal region in which the seal material of the one substrate is arranged, there is a light-shielding film, such as a wiring, related to driving the transistor, incident light is shielded by the light-shielding film, and there is a possibility that curing of the seal material is hindered.

Therefore, for example, JP-A-2000-89235 discloses a liquid crystal display configured to transmit light by disposing a slit in a light-shielding film located directly above or directly below a photo-curable type seal material sandwiched between two substrates. According to JP-A-2000-89235, in order to ensure curing of the seal material, it is said that it is preferable to set the width of the light-shielding film to not greater than 150 μm and the opening width to not less than 5 μm.

Further, for example, JP-A-2007-41346 discloses an electro-optical device including a driving circuit unit which is disposed in a peripheral region located around an image display region of the first substrate and supplies various signals to a pixel unit, a driving power supply line which includes an extending portion extending so as to overlap a seal region and supplies a power supply potential to the driving circuit unit, and a counter electrode potential line which includes a wiring portion overlapping the extending portion via an interlayer insulating film and supplies a predetermined potential to the counter electrode. JP-A-2007-41346 describes that a photo-curable resin is arranged in the seal region to form a sealing portion, and gaps are disposed for each of the extending portion and the wiring portion in the seal region in order to irradiate the photo-curable resin with light from the first substrate side.

In the above-mentioned JP-A-2000-89235 and JP-A-2007-41346, although specific numerical values are not illustrated for the width of the seal region where the photo-curable type seal material is arranged, in discussing the reliability of the liquid crystal display element as an electro-optic device, the width of the seal region is an important factor. When the width of the seal region in which the seal material is arranged is narrowed, the bonding strength of the pair of substrates is affected, and moisture and the like easily enter the liquid crystal layer surrounded by the seal material from the outside. Therefore, it is necessary to secure a predetermined width for the seal region. On the other hand, as described in JP-A-2007-41346, not only the peripheral region but also the driving circuit unit and the like are arranged in the peripheral region outside the image display region. Thus, it is difficult to reduce the size of the electro-optical device when the peripheral region is secured so as to include the seal region having a predetermined width.

SUMMARY

An electro-optical device according to an aspect of the present disclosure is an electro-optical device in which an electro-optical element is provided between a first substrate and a second substrate which are disposed to face each other via a photo-curable type seal material, wherein at least the second substrate is transmissive and includes a light-shielding pattern in apart of a seal region of the first substrate where the seal material is disposed, and a semiconductor layer of a transistor included in a driving circuit for driving the electro-optical element is disposed to overlap, in plan view, with the light-shielding pattern.

In the electro-optical device described above, it is preferable that the first substrate and the second substrate be transmissive, and that the semiconductor layer be disposed between the light-shielding pattern and a light-shielding layer disposed in an island-shape on the first substrate.

In the electro-optical device described above, the transistor may include two transistors coupled in parallel.

In the electro-optical device described above, it is preferable that the light-shielding pattern include a plurality of light-shielding patterns arranged at intervals in plan view, that the semiconductor layer in one of the two transistors coupled in parallel be disposed on the first substrate to overlap, in plan view, with one of two adjacent light-shielding patterns of the plurality of the light-shielding patterns, and that the semiconductor layer in the other of the two transistors coupled in parallel be disposed on the first substrate to overlap, in plan view, with the other of the two adjacent light-shielding patterns.

In the electro-optical device described above, the light-shielding pattern is a power supply wiring.

In the electro-optical device described above, the electro-optical element may be a liquid crystal element and may include a pixel electrode provided for each pixel on the first substrate and a common electrode that is provided on the second substrate and to which a common potential is supplied, and the light-shielding pattern may be a common potential wiring.

An electronic apparatus according to an aspect of the present disclosure includes the electro-optical device described above.

DESCRIPTION OF EXEMPLARY EMBODIMENTS

Figure 1:
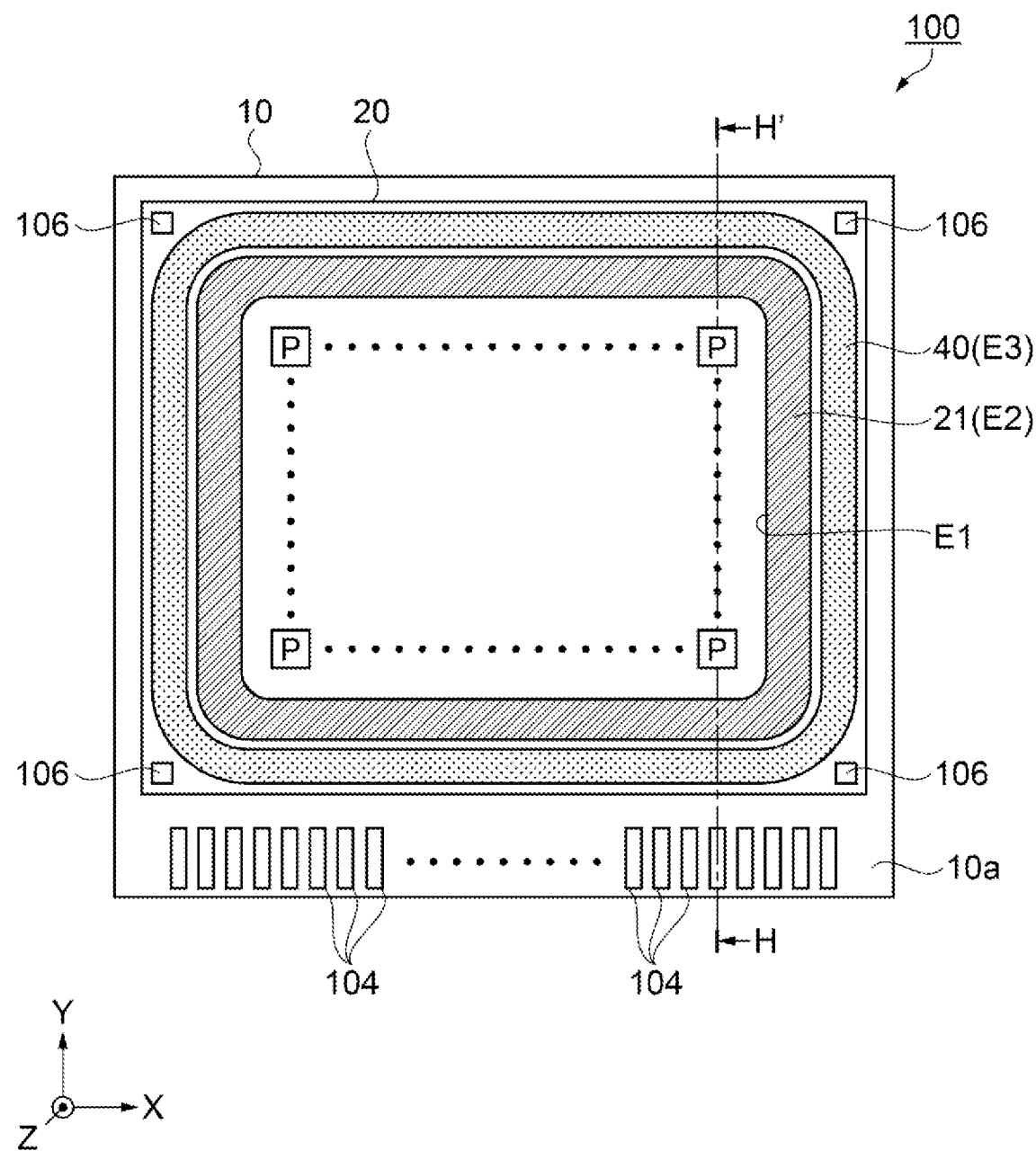
FIG. 1 is a schematic plan view illustrating a configuration of a liquid crystal device according to a first exemplary embodiment.

Exemplary embodiments of the disclosure will be described below with reference to the accompanying drawings. Note that in the drawings referred to below, the parts described are illustrated in an enlarged or reduced state as appropriate so that those parts can be easily recognized.

First Exemplary Embodiment

Electro-Optical Device

An electro-optical device according to the present exemplary embodiment will be described by taking, as an example, an active matrix liquid crystal display device including a Thin Film Transistor (TFT) as a switching element of a pixel. The liquid crystal device can be suitably used as light modulation means (light valve) of, for example, a projection-type display device (liquid crystal projector) described below.

First, a basic configuration of a liquid crystal device as an electro-optical device according to a first exemplary embodiment will be described with reference to FIG. 1 to FIG. 4. FIG. 1 is a schematic plan view illustrating a configuration of a liquid crystal device according to the first exemplary embodiment, FIG. 2 a schematic cross-sectional view illustrating the structure of the liquid crystal device of the first exemplary embodiment taken along line H-H' in FIG. 1, FIG. 3 a circuit diagram illustrating an electrical configuration of the liquid crystal device according to the first exemplary embodiment, and FIG. 4 an equivalent circuit diagram illustrating a configuration of a pixel circuit in the liquid crystal device according to the first exemplary embodiment.

Figure 2:
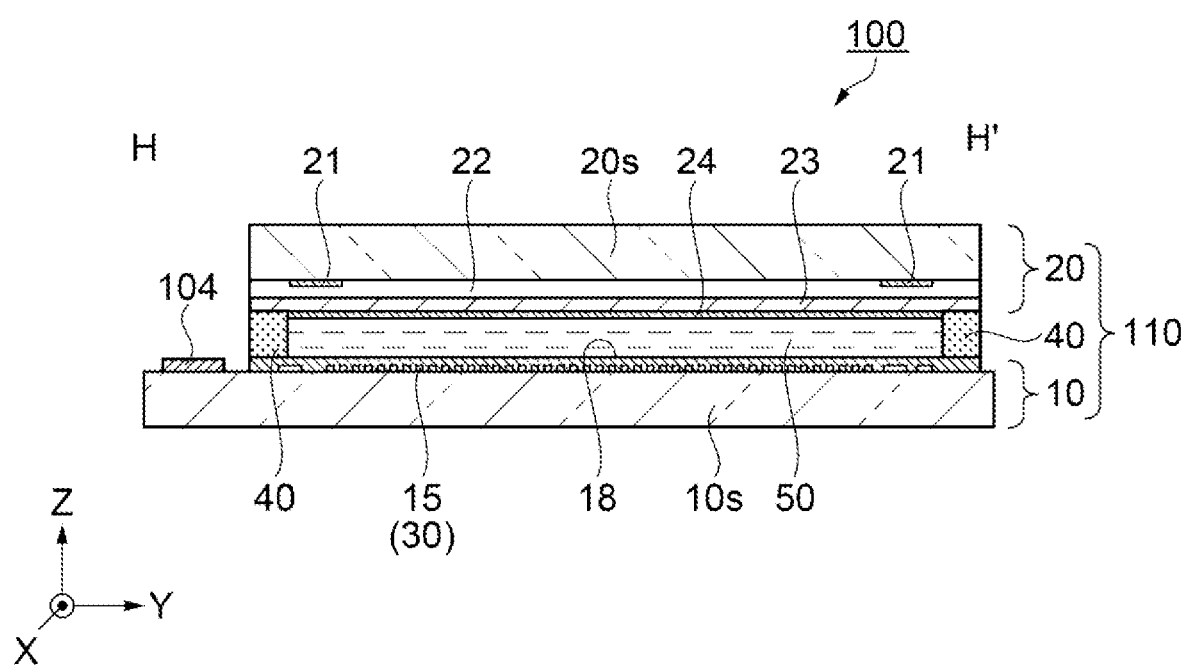
FIG. 2 is a schematic cross-sectional view illustrating a structure of the liquid crystal device according to the first exemplary embodiment taken along line H-H' in FIG. 1.

As illustrated in FIG. 1 and FIG. 2, a liquid crystal device 100 of the first exemplary embodiment includes an element substrate 10 and a counter substrate 20 oppositely arranged, and a liquid crystal layer 50 interposed between a pair of these substrates. For example, a quartz substrate, a glass substrate or the like having a translucent property is used for each of a base substrate 10s of the element substrate 10 and a base substrate 20s of the counter substrate 20. The liquid crystal layer 50 is an example of a liquid crystal element of the electro-optical element of the present disclosure.

The element substrate 10 is larger than the counter substrate 20, and both the element substrate 10 and the counter substrate 20 are adhered with an interval via a seal material 40 arranged along an outer edge of the counter substrate 20. Examples of a method for constructing the liquid crystal layer 50 at an interval sealed by the seal material 40 include an ODF (One Drop Fill) method in which liquid crystal is dropped inside the seal material 40 arranged in a frame shape and the element substrate 10 and the counter substrate 20 are bonded together.

In the present exemplary embodiment, as the seal material 40, for example, an adhesive such as a light (ultraviolet) curable epoxy resin is employed. The seal material 40 is mixed with a spacer (not illustrated) configured to keep the interval between the pair of substrates constant.

A display region E1 including a plurality of pixels P arrayed in a matrix shape is disposed on an inner side of the seal material 40. In addition, a partition portion 21 surrounding the display region E1 is disposed in a peripheral region E2 between the seal material 40 and the display region E1. The partition portion 21 is made of, for example, a metal or a metal oxide having a light-shielding property. A region surrounding the peripheral region E2 where the partition portion 21 is arranged and on which the seal material 40 is arranged on the design is referred to as a seal region E3. Note that, in addition to the pixels P contributing to display, the display region E1 may include a plurality of dummy pixels. Similarly, the peripheral region E2 may include a plurality of dummy pixels.

A terminal portion 10a in which a plurality of external coupling terminals 104 are arrayed is disposed in a part of the element substrate 10 protruding outward from the counter substrate 20. A flexible circuit substrate (not illustrated) for electrically coupling to the external driving circuit is mounted on the terminal portion 10a.

Hereinafter, the direction in which the external coupling terminals 104 are arrayed in the terminal portion 10a of the element substrate 10 is defined as an X direction, and the direction orthogonal to the X direction within the same plane is defined as a Y direction. Further, the direction, which is orthogonal to the X direction and the Y direction and is oriented from the element substrate 10 side to the counter substrate 20 side, is defined as a Z direction. In addition, "in plan view" or "planarly" refers to viewing in the direction opposite to the Z direction, that is, viewing from the counter substrate 20 side toward the element substrate 10 side. In the present exemplary embodiment, the pixels P are arranged in matrix shape along the X direction and the Y direction in the display region E1.

As illustrated in FIG. 2, on the surface of the element substrate 10 on the liquid crystal layer 50 side, a light transmissive pixel electrode 15 and a Thin Film Transistor (hereinafter referred to as TFT) 30 as a switching element, which are disposed for each pixel P, a signal wiring, and an alignment film 18 covering these are formed. In addition, a light-shielding structure is adopted to prevent light from entering a semiconductor layer in the TFT 30 and to prevent the switching operation from becoming unstable. The element substrate 10 includes a light transmissive base material 10s, a pixel electrode 15 formed on the base material 10s, a TFT 30, a signal wiring, and an alignment film 18. Note that the base material 10s is an example of a first substrate in the present disclosure.

The counter substrate 20 opposed to the element substrate 10 includes a light-transmissive base material 20s, a partition portion 21 formed on the base material 20s, a planarization layer 22 formed to cover the substrate 20s, a counter electrode 23 which covers the planarization layer 22 and is disposed at least over the display region E1 and functions as a common electrode, and an alignment film 24 which covers the counter electrode 23. The substrate 20s is an example of a second substrate in the present disclosure.

The partition portion 21 is disposed so as to surround the display region E1 as illustrated in FIG. 1. As a result, unnecessary stray light from the counter substrate 20 side is prevented from being incident on the display region E1, and high contrast in displaying of the display region E1 is ensured.

The planarization layer 22 is made of an inorganic material such as silicon oxide, and the planarization layer 22 has a light transmissive property and is disposed to cover the partition portion 21. Examples as a method of forming such a planarization layer 22 include a method of forming a film by plasma CVD and the like.

The counter electrode 23 is made of a transparent conductive film such as Indium Tin Oxide (ITO), and the counter electrode 23 covers the planarization layer 22 and is also electrically coupled to vertical conduction portions 106 disposed at four corners of the counter substrate 20 as illustrated in FIG. 1. The vertical conduction portions 106 are electrically coupled to the wiring on the element substrate 10 side.

The alignment film 18 covering the pixel electrode 15 and the alignment film 24 covering the counter electrode 23 are selected based on an optical design of the liquid crystal device 100. As the alignment films 18 and 24, for example, an organic alignment film or an inorganic alignment film may be given, wherein the organic alignment film is manufactured by forming a film of organic material such as polymide and causing liquid crystal molecules having positive dielectric anisotropy to be substantially horizontally aligned in a predetermined direction by rubbing the surface of the film of organic material, and the inorganic alignment film which is manufactured by forming a film of inorganic material such as $SiO_x$ (silicon oxide) using vapor phase growth method and causing liquid crystal molecules having negative dielectric anisotropy to be substantially vertically aligned to a surface of the film.

Such a liquid crystal device 100 is of a light transmissive-type, and an optical design of a normally white mode in which the transmittance of the pixel P is maximum in a voltage application state or a normally black mode in which the transmittance of the pixel P is minimum in a non-voltage application state is employed. According to the optical design, a polarizing element is arranged on each of a light incidence side and a light emitting side of the liquid crystal panel 110 including the element substrate 10 and the counter substrate 20. Note that an optical element such as a microlens may be disposed for effectively guiding the incident light to the pixel P on the substrate on the light incident side among the element substrate 10 and the counter substrate 20.

Figure 3:
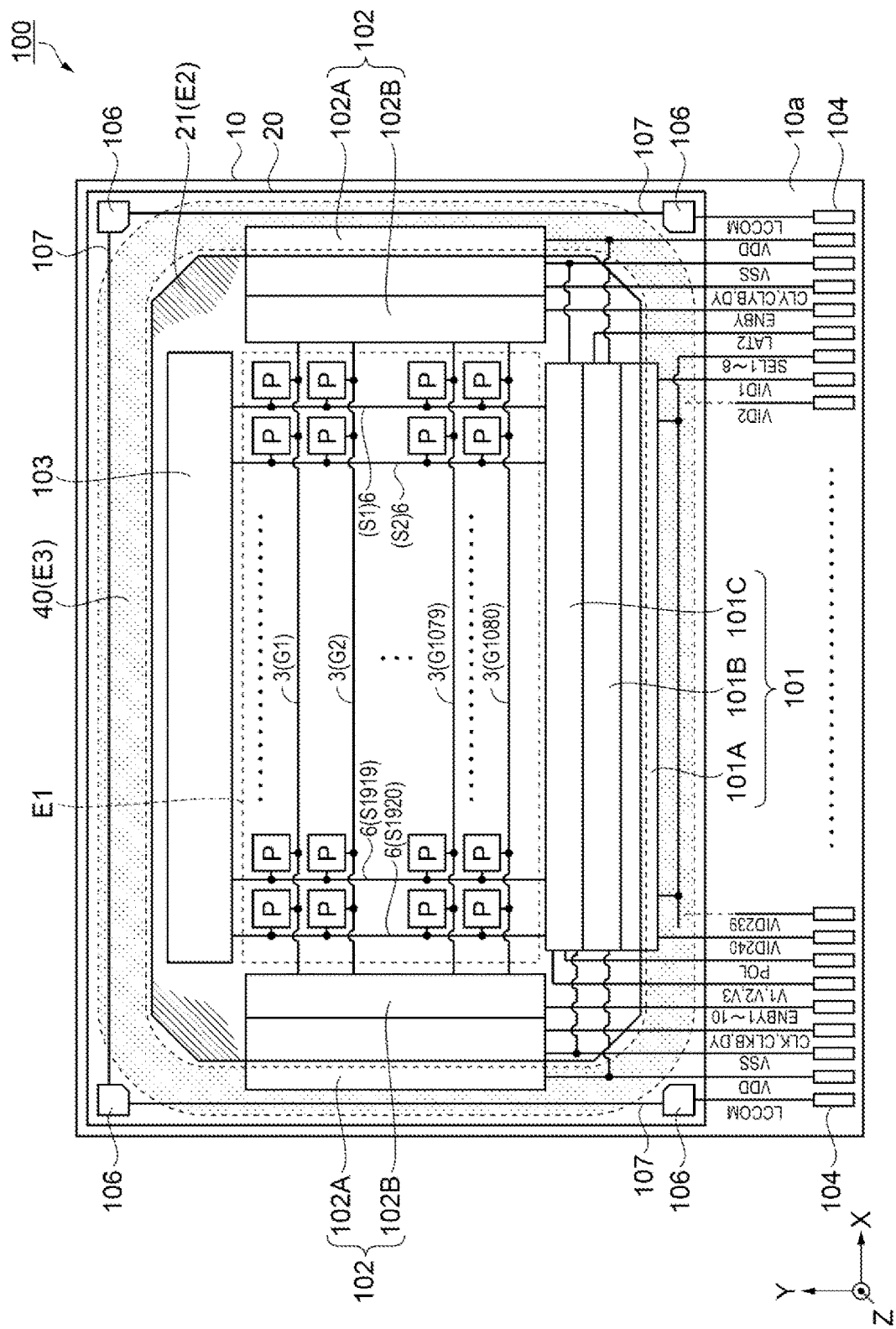
FIG. 3 is a circuit diagram illustrating an electrical configuration of the liquid crystal device of the first exemplary embodiment.
Figure 4:
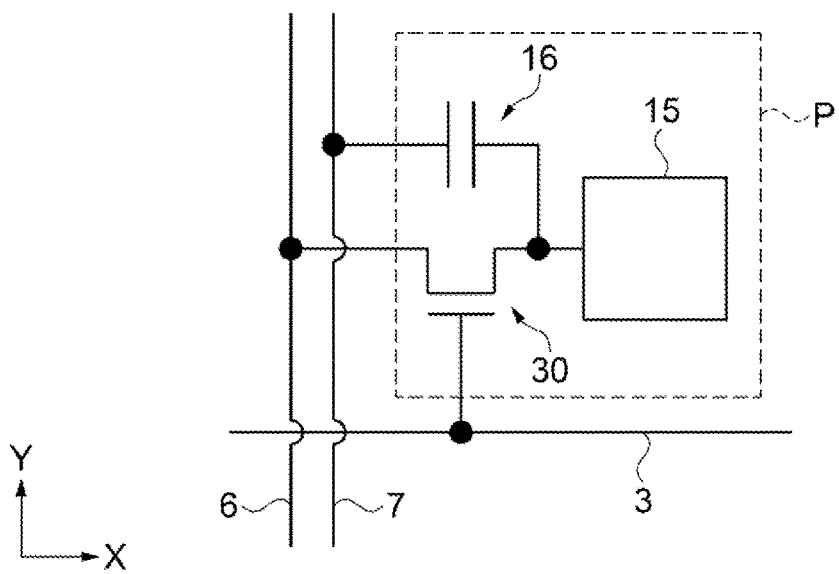
FIG. 4 is an equivalent circuit diagram illustrating a pixel circuit in the liquid crystal device of the first exemplary embodiment.

As illustrated in FIG. 3, the liquid crystal device 100 of the present exemplary embodiment is, for example, a Full High Definition (FHD) standard, and includes at least 1920 pixels P in the horizontal direction (X direction), and at least 1080 pixels P in the vertical direction (Y direction). As illustrated in FIG. 4, each pixel P is arranged corresponding to the intersection of a scan line 3 extending in the X direction and a data line 6 and a capacitor line 7 extending in the Y direction. In the pixel P, a pixel circuit including the pixel electrode 15, the TFT 30, and a holding capacitor 16 is disposed. Each scan line 3 is coupled to a gate of the TFT 30, each data line 6 is coupled to a source of the TFT 30, and each pixel electrode 15 is coupled to a drain of the TFT 30. The holding capacitor 16 is coupled between the drain of the TFT 30 and the capacitor line 7. Note that the capacity line 7 to which a constant potential is applied is not limited to extending in the Y direction, and may extend in the X direction.

Returning to FIG. 3, on the element substrate 10, a data line driving circuit 101 is disposed between the terminal portion 10a and the display region E1. Further, a scan line driving circuit 102 is disposed between a pair of side portions to face each other in the X direction and the display region E1. In addition, an inspection circuit 103 is disposed between the seal material 40 (seal region E3) and the display region E1 along the side portion on a side opposite to the terminal portion 10a in the Y direction. The data line driving circuit 101 and the scan line driving circuit 102 are peripheral circuits serving as driving circuits related to driving control of the pixel circuits. The inspection circuit 103 is a peripheral circuit that performs a short circuit inspection or uncoupling inspection of the data line 6, or inspection of various defects of the pixel P.

In the present exemplary embodiment, the data line driving circuit 101 is configured to include a first latching circuit 101A, a second latching circuit 101B, and a voltage selecting circuit 101C sequentially arranged from the terminal portion 10a toward the display region E1 in the Y direction. The scan line driving circuit 102 includes a shift register 102A and an output control circuit 102B arranged in order from a pair of side portions opposite to in the X direction toward the display region E1. Note that, the output control circuit 102B includes a buffer.

A plurality (1920) of data lines 6 is coupled to the data line driving circuit 101. A plurality (1080) of scan lines 3 is coupled to the scan line driving circuit 102. Various drive signals and power supply potentials VDD and VSS are inputted to the data line driving circuit 101 and the scan line driving circuit 102 via the external coupling terminals 104, respectively. Further, in the terminal portion 10a of the element substrate 10, the external coupling terminals 104 located at both ends in the X direction among the plurality of external coupling terminals 104 are coupled to the vertical conduction portion 106, and a common potential (LCCOM) is inputted. As described above, the counter electrode 23 of the counter substrate 20 is coupled to the vertical conducting portion 106, thus the common potential (LCCOM) is applied to the counter electrode 23 via the vertical conducting portion 106. A common potential wiring 107 for electrically coupling the vertical conducting portions 106 disposed at the four corners is disposed in the element substrate 10.

The shift register 102A of the scan line driving circuit 102 is driven by the clock signals CLK and CLKB, and sequentially transfers the signals to the plurality of scan lines 3 (G1, G2, . . . , G1079, G1080) when a start pulse DY is inputted. The control signal is a signal related to ON (selection)/OFF (non-selection) of the TFT 30 of the pixel circuit coupled to the scan line 3. In addition, the output control circuit 102B enables scanning of the display region E1 with ten signals of output control signals ENBY1 to ENBY10, and appropriately selects a plurality of scan lines 3 (G1, G2, ... G1079, G1080). With the configuration described above, the liquid crystal device 100 can divide one frame into ten subframes and can perform weighted time-division driving.

The first latching circuit 101A of the data line driving circuit 101 stores video signals VID1 to VID240 which are digital signals in the first latching circuit 101A by first latch signals SEL1 to SEL8 under demultiplex driving. The second latching circuit 101B is coupled to the subsequent stage of the first latching circuit 101A and simultaneously transfers logic states stored in the first latching circuit 101A to the second latching circuit 101B by a second latch signal LAT2. A voltage selecting circuit 101C is coupled to the subsequent stage of the second latching circuit 101B. The voltage selecting circuit 101C outputs one of the voltages V1, V2 and V3 according to the logic state stored in the second latching circuit 101B and polarity signal POL instructing the polarity of the subframe while writing to the pixel P as plural data to a plurality of the data lines 6 (S1, S2 ... S1919, S1920). If the liquid crystal device 100 is in the normally black mode and the common potential (LC-COM) is 7V as described above, for example, V1 is a positive polarity white display voltage and is 12V. V2 is a voltage for black display which is common for both polarities and is 7V. V3 is a negative polarity white display voltage and is 2V. That is, the liquid crystal device 100 performs displaying by alternating current driving in which the potential changes between a positive polarity potential and a negative polarity potential with reference to the common potential (LCCOM).

In the present exemplary embodiment, as peripheral circuits, the data line driving circuit 101, the scan line driving circuit 102, and the inspection circuit 103 are arranged so as to overlap the partition portion 21 in plan view. Further, among these peripheral circuits, the first latching circuit 101A is arranged so as to overlap the seal region E3 in plan view. Further, the shift register 102A is also arranged so as to overlap the seal region E3 in plan view. Therefore, the lengths in the X direction and the Y direction of the element substrate 10 are shorter than the lengths in the case where the partition portion 21 is expanded so as to overlap with all of these peripheral circuits.

Arranging the first latching circuit 101A and the shift register 102A in the seal region E3 where the photo-curable type seal material 40 is arranged affects a process of curing the seal material 40 by radiating the light to it. Therefore, in the present exemplary embodiment, the configuration and arrangement of the first latching circuit 101A and the shift register 102A are devised so as not to affect the curing of the seal material 40. Hereinafter, each circuit will be described with reference to the drawings.

Configuration and Arrangement of First Latching Circuit

Figure 5:
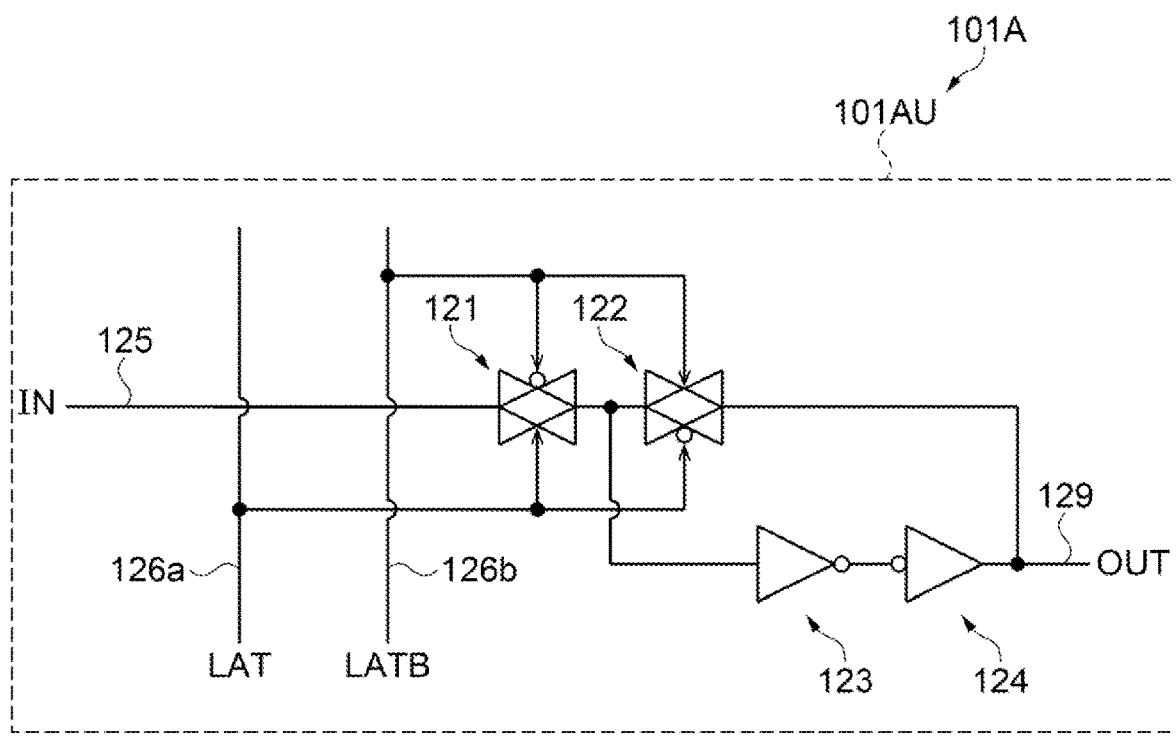
FIG. 5 is a circuit diagram illustrating a configuration of a first latching circuit.
Figure 6:
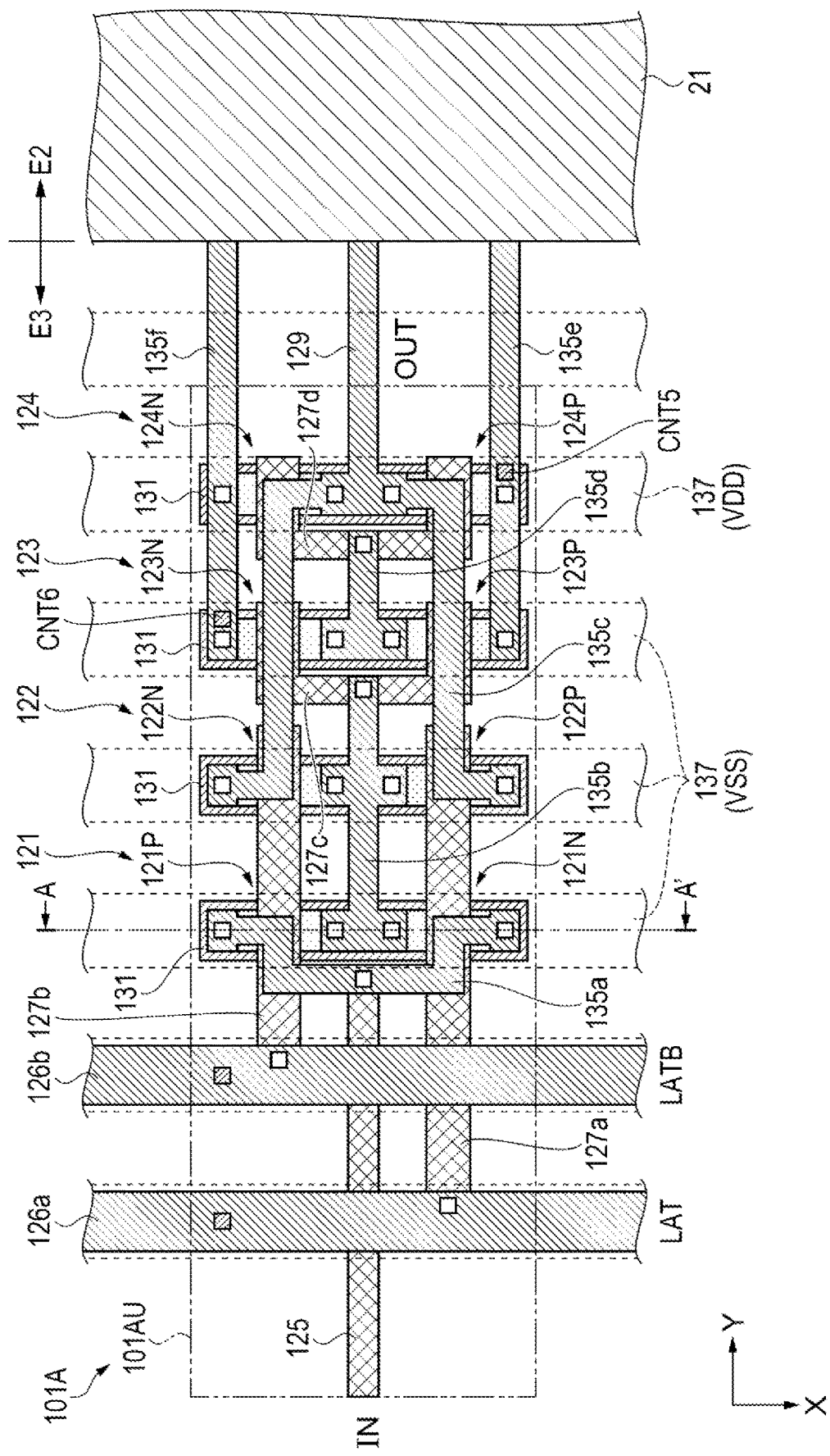
FIG. 6 is a plan view illustrating an arrangement of each component of the first latching circuit in a seal region.
Figure 7:
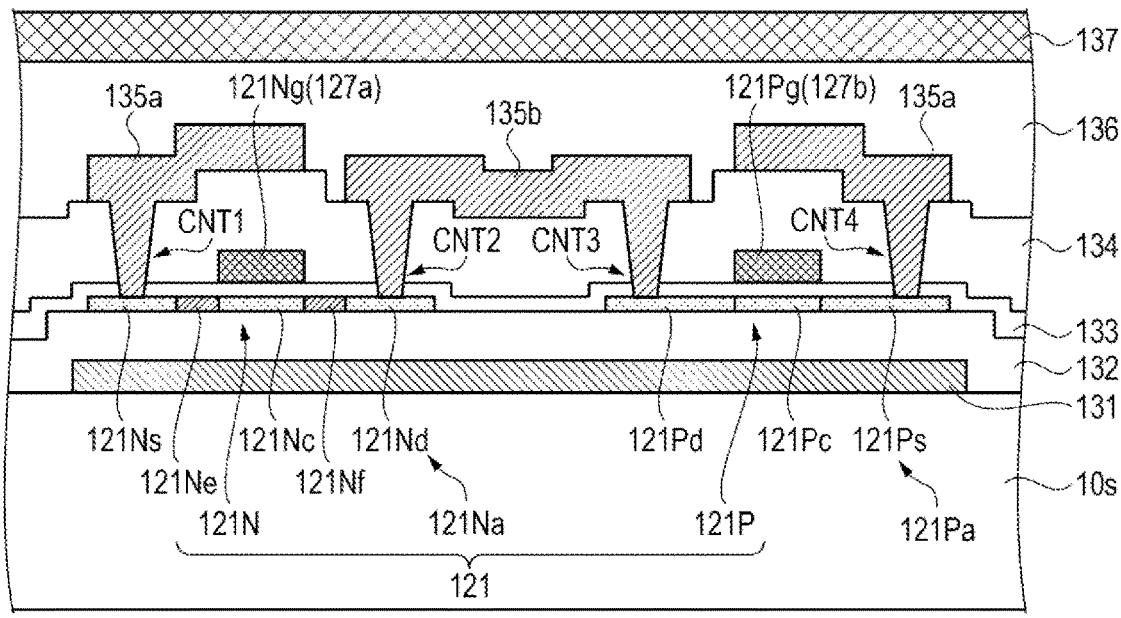
FIG. 7 is a cross-sectional view illustrating a structure of the first latching circuit taken along line A-A' in FIG. 6.

FIG. 5 is a circuit diagram illustrating a configuration of the first latching circuit, FIG. 6 a plan view illustrating an arrangement of each component of the first latching circuit in the seal region, and FIG. 7 a cross-sectional view illustrating a structure of the first latching circuit taken along line A-A' in FIG. 6. Note that, FIG. 5 illustrates the configuration of a latching circuit unit (unit) corresponding to one data line 6. That is, the first latching circuit 101A includes 1920 latching circuit units 101AU.

As illustrated in FIG. 5, the latching circuit unit 101AU of the first latching circuit 101A in the present exemplary embodiment is configured to include two analog switches (ASW) 121, 122 and two inverters (INV) 123, 124. Each of the two ASWs 121 and 122 is a transfer gate (transmission gate) composed of, for example, an N-type transistor and a P-type transistor. Each of the two INVs 123 and 124 is also composed of, for example, an N-type transistor and a P-type transistor. INV 123 and INV 124 are electrically coupled in series to function as a memory element.

As illustrated in FIG. 6, in the seal region E3 outside the peripheral region E2 where the partition portion 21 is arranged, each of the ASW 121, the ASW 122, the INV 123, and the INV 124 is arranged in an island shape extending in the X direction and are arranged at intervals in the Y direction. In addition, an island-shaped light-shielding layer 131 is arranged on the back side of each of the ASW 121, the ASW 122, the INV 123, and the INV 124 so as to overlap each of them in plan view. Further, a light-shielding pattern 137 is arranged on the front side of each of the ASW 121, the ASW 122, the INV 123, and the INV 124 so as to overlap each of them in plan view. That is, the light-shielding pattern 137 is a film used for shielding the semiconductor layer of the transistor, and is referred to as a light-shielding pattern in the present exemplary embodiment because the light-shielding pattern 137 is arranged to extend along the seal region E3 with respect to the island-shaped light-shielding layer 131. Note that, in FIG. 6, an outline of the light-shielding pattern 137 is indicated by a dashed line for convenience of understanding the configuration of the lower layer. In the present exemplary embodiment, the power supply potential VSS is supplied to the light-shielding pattern 137 overlapping each of the ASW 121, the ASW 122, and the INV 123 in plan view, and the power supply potential VDD is applied to the light-shielding pattern 137 overlapping the INV 124 in plan view. That is, the light-shielding pattern 137 is a power supply wiring.

In the Y direction outside the ASW 121, two signal lines 126a and 126b extending in the X direction are arranged with an interval in the Y direction. A latch signal LAT is supplied to the signal line 126a, and an inverted latch signal LATB is supplied to the signal line 126b. The latch signal LAT corresponds to the first latch signals SEL1 to SEL8 in the first latching circuit 101A described above. In detail, the first latch signals SEL1 to SEL8 are respectively buffered, and at the same time an inverted signal is generated, so as to become a latch signal LAT and an inverted latch signal LATB.

The signal line 126a to which the latch signal LAT is supplied is coupled to a gate of an N-type transistor 121N in the ASW 121 and a gate of a P-type transistor 122P in the ASW 122 by a coupling wiring 127a extending in the Y direction. Further, the signal line 126b to which the inverted latch signal LATB is supplied is coupled to a gate of the P-type transistor 121P in the ASW 121 and a gate of an N-type transistor 122N in the ASW 122 by a coupling wiring 127b extending in the Y direction.

The input wiring 125, which extends in the Y direction between the coupling wiring 127a and the coupling wiring 127b and is supplied with any one of the video signals VID1 to VID240, is coupled to input sides of the N-type transistor 121N and the P-type transistor 121P of the ASW 121 via a coupling wiring 135a. Outputs of the N-type transistor 121N and the P-type transistor 121P of the ASW 121 are coupled to input sides of the N-type transistor 122N and the P-type transistor 122P of the ASW 122 via a coupling wiring 135b extending in the Y direction. Further, the output of the ASW 121 is coupled to gates of an N-type transistor 123N and a P-type transistor 123P of the INV 123 via a coupling wiring 127c coupled to the coupling wiring 135b. Outputs of the N-type transistor 123N and the P-type transistor 123P of the INV 123 are coupled to gates of an N-type transistor 124N and a P-type transistor 124P of the INV 124 via a coupling wiring 135*d* and the coupling wiring 127*d*. The inputs of the N-type transistor 122N and the P-type transistor 122P of the ASW 122 and the outputs of the N-type transistor 124N and the P-type transistor 124P of the INV 124 are coupled by the coupling wiring 135*c*, and the coupling wiring 135*c* is coupled to an output wiring 129. In the present exemplary embodiment, the coupling wiring 135*c* and the output wiring 129 are integrally formed in the same wiring layer.

A coupling wiring 135*e* coupled to the P-type transistor 123P of the INV 123 and the P-type transistor 124P of the INV 124 is coupled to the light-shielding pattern 137 to which the power supply potential VDD is supplied by a contact hole CNT5 disposed on the P-type transistor 124P side. Further, a coupling wiring 135*f* coupled to the N-type transistor 123N of the INV 123 and the N-type transistor 124N of the INV 124 is coupled to the light-shielding pattern 137 to which the power supply potential VSS is supplied by a contact hole CNT6 disposed on the N-type transistor 123N side.

According to such a latching circuit unit 101AU, one of the video signals VID1 to VID240 inputted to the input wiring 125 is stored in the latching circuit unit 101AU by the latch signal LAT and the inverted latch signal LATB. Then, according to the second latch signal LAT2 inputted to the data line driving circuit 101, the video signals stored in the latching circuit unit 101AU is outputted to the second latching circuit 101B in the subsequent stage.

Note that, in FIG. 6, wirings hatched with the same pattern are formed in the same wiring layer on the base material 10*s*. Specifically, the input wiring 125 and the coupling wirings 127*a*, 127*b*, 127*c*, and 127*d* are formed in the same wiring layer. Further, the signal lines 126*a* and 126*b*, the coupling wirings 135*a*, 135*b*, 135*c*, 135*d*, 135*e* and 135*f* and the output wiring 129 are formed in the same wiring layer.

Next, the wiring structure of the latching circuit unit 101AU will be described by taking the ASW 121 as an example. The line A-A' in FIG. 6 is a line segment crossing the ASW 121 in the X direction, and FIG. 7 is a cross-sectional view illustrating the wiring structure of the ASW 121 on the base material 10*s* of the element substrate 10.

As illustrated in FIG. 7, the light-shielding layer 131 is firstly formed on the light transmissive base material 10*s*. According to the relationship that the semiconductor layer of an N-type or P-type transistor to be formed later is formed by high-temperature treatment at 1000° C. or higher, the light-shielding layer 131 of the present exemplary embodiment is formed by using a single metal, an alloy, a metal silicide, which include at least one of high melting point metals such as Ti, Cr, Mo, Ta, and W, a stacked body of these materials, or conductive polysilicon, and the like. In particular, from the view point of shielding light incident from the base material 10*s* side and prevent the light incident from the side opposite to the base material 10*s* from being reflected to the semiconductor layer side of the transistor, the light-shielding layer 131 is preferably formed by using a metal silicide having a light-shielding property, and in the present exemplary embodiment, the light-shielding layer 131 is formed by using tungsten silicide (WSi). The film thickness of the light-shielding layer 131 is, for example, 150 nm. Note that the light-shielding layer 131 is formed in an island shape so as to overlap the ASW 121 in plan view as described above by a photolithography method.

A first insulating film 132 is formed to cover the light-shielding layer 131. The first insulating film 132 is formed by using, for example, a silicon oxide film (None-doped Silicate Glass; NSG film) or a silicon nitride film ($Si_xN_y$ film) which is not intentionally introduced with impurities. Examples of a method of forming the first insulating film 132 can include an atmospheric pressure CVD method, a low pressure CVD method, or a plasma CVD method using a processing gas such as monosilane ($SiH_4$), dichlorosilane ($SiCl_2H_2$), tetraethoxysilane (TEOS), and ammonia. The film thickness of the first insulating film 132 is, for example, 200 nm.

Next, a semiconductor layer 121Na of the N-type transistor 121N and a semiconductor layer 121Pa of the P-type transistor 121P are formed on the first insulating film 132. The semiconductor layer 121Na and the semiconductor layer 121Pa are made of a polysilicon film obtained by crystallizing an amorphous silicon film deposited by, for example, a low pressure CVD method or the like. N-type impurity ions are selectively implanted into the polysilicon film to form a source region 121Ns, a lightly doped source region 121Ne, a channel region 121Nc, a lightly doped drain region 121Nf, and a drain region 121Nd, and to configure the semiconductor layer 121Na. Further, P-type impurity ions are selectively implanted into the polysilicon film to form the drain region 121Pd, the channel region 121Pc, and the source region 121Ps, and to configure the semiconductor layer 121Pa. The thickness of each semiconductor layer 121Na, 121Pa is, for example, 50 nm.

Next, agate insulating film 133 covering the semiconductor layer 121Na and the semiconductor layer 121Pa is formed. The gate insulating film 133 has a double-layer structure including, for example, a first silicon oxide film obtained by thermally oxidizing a silicon semiconductor film of silicon, and a second silicon oxide film formed under a high-temperature condition of 700° C. to 900° C. by using a low pressure CVD method. The film thickness of the gate insulating film 133 is, for example, 75 nm.

Next, on the gate insulating film 133, a gate electrode 121Ng is formed at a position facing the channel region 121Nc of the semiconductor layer 121Na. Further, a gate electrode 121Pg is formed at a position facing the channel region 121Pc of the semiconductor layer 121Pa. The gate electrodes 121Ng and 121Pg are formed by using a conductive polysilicon film, a metal silicide film, a metal film, a metal compound film, or the like. In the present exemplary embodiment, the gate electrodes 121Ng and 121Pg have a double-layer structure of a conductive polysilicon film and a tungsten silicide film. The conductive polysilicon film is formed to contain phosphorus atoms at concentration of $1 \times 10^{19}$ pieces/cm$^3$ or greater by depositing a polysilicon film doped with phosphorus (P) by a low-pressure CVD method, and subsequently performing a phosphorus diffusion treatment. The film thickness of the gate electrodes 121Ng and 121Pg is, for example, 150 nm. The atoms doped into the polysilicon film are not limited to phosphorus (P).

Further, in the present exemplary embodiment, apart of the coupling wiring 127*a* (see FIG. 6) functions as the gate electrode 121Ng, and a part of the coupling wiring 127*b* (see FIG. 6) functions as the gate electrode 121Pg.

Next, a second insulating film 134 covering the gate insulating film 133 and the gate electrodes 121Ng and 121Pg is formed. The second insulating film 134 is formed by using a silicon-based oxide film such as the NSG film described above, or a Phosphor Silicate Glass (PSG) film containing phosphorus (P), a Boro Silicate Glass (BSG) film containing boron (B), and a Boro-Phospho Silicate Glass (BPSG) film containing boron (B) and phosphorus (P). Examples of a method for forming these silicon-based oxide films can include an atmospheric pressure CVD method, a low pressure CVD method, or a plasma CVD method using monosilane, dichlorosilane, TEOS, triethylborate (TEB), trimethyl phosphate (TMPO), or the like. The film thickness of the second insulating film 134 is, for example, 300 nm.

A total of four through holes are formed penetrating the second insulating film 134 and the gate insulating film 133 to reach the source region 121Ns, the drain region 121Nd of the semiconductor layer 121Na, the drain region 121Pd and the source region 121Ps of the semiconductor layer 121Pa. By forming and patterning a conductive film on the second insulating film 134 so as to cover at least the inner walls of these through holes or to fill the through holes, the coupling wiring 135a electrically coupled to a contact hole CNT1 and the source region 121Ns via the contact hole CNT1 is formed. In addition, the coupling wiring 135a is also coupled to the source region 121Ps of the semiconductor layer 121Pa via a contact hole CNT4. In addition, the coupling wiring 135b electrically coupled to the drain region 121Nd of the semiconductor layer 121Na via a contact hole CNT2 and electrically coupled to the drain region 121Pd of the semiconductor layer 121Pa via a contact hole CNT3 is formed. The conductive films forming the coupling wirings 135a and 135b, the contact holes CNT1, CNT2, CNT3, and CNT4 may have a multilayer structure including a layer made of, for example, aluminum (Al) which is a low resistance metal, or titanium (Ti), titanium nitride (TiN), or the like. The thickness of a wiring layer including the coupling wirings 135a and 135b is, for example, 500 nm. The reference numeral 135 is given to the wiring layer, and is referred to as a first wiring layer 135.

Next, a third insulating film 136 covering the first wiring layer 135 is formed. As with the second insulating film 134, the third insulating film 136 is also formed by using a silicon-based oxide film such as an NSG film, a PSG film, a BSG film, or a BPSG film. The surface of the formed third insulating film 136 is affected by the wiring layer of the lower layer and unevenness occurs, thus planarization processing such as CMP processing is performed on the surface of the third insulating film 136. The average film thickness of the third insulating film 136 after the planarization processing is, for example, 300 nm.

Next, a plurality of light-shielding patterns 137 is formed on the third insulating film 136. As with the first wiring layer 135 described above, the light-shielding pattern 137 may have a multilayer structure including a layer made of, for example, aluminum (Al) which is a low resistance metal, or titanium (Ti), titanium nitride (TiN), or the like. The film thickness of the light-shielding pattern 137 is, for example, 500 nm. A wiring layer on which the plurality of light-shielding patterns 137 is formed may also be collectively referred to as a second wiring layer 137.

Configuration and Arrangement of Shift Register

Figure 8:
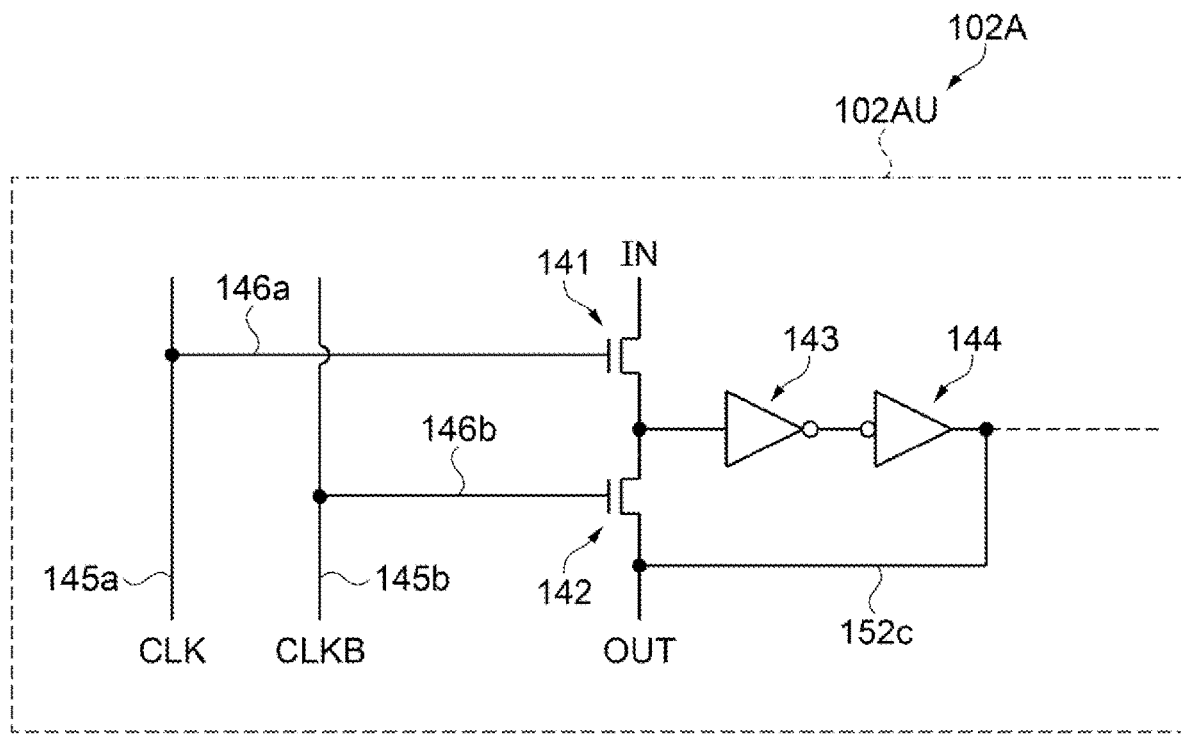
FIG. 8 is a circuit diagram illustrating a configuration of a shift register.
Figure 9:
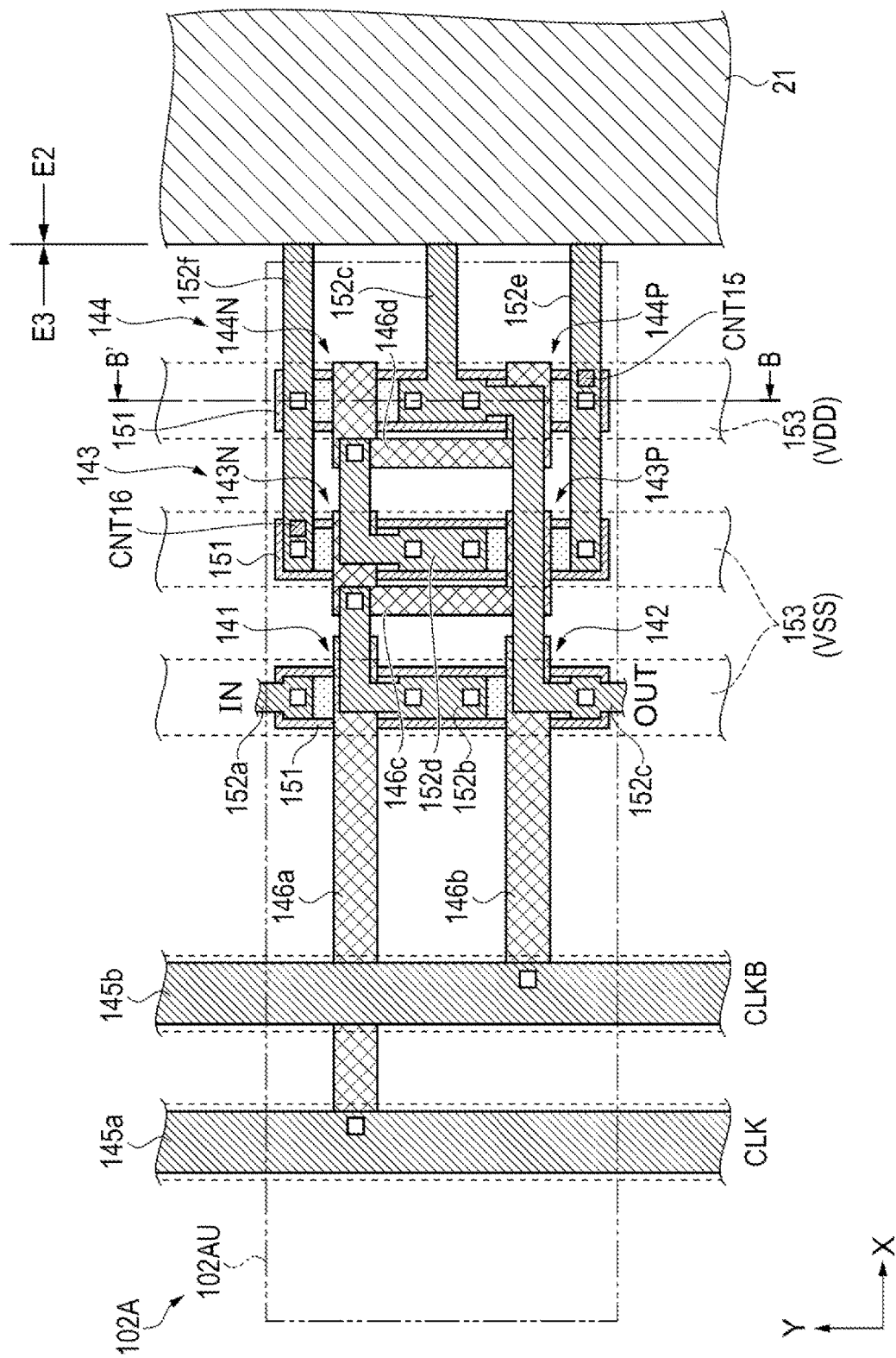
FIG. 9 is a plan view illustrating an arrangement of each configuration of the shift register in a seal region.
Figure 10:
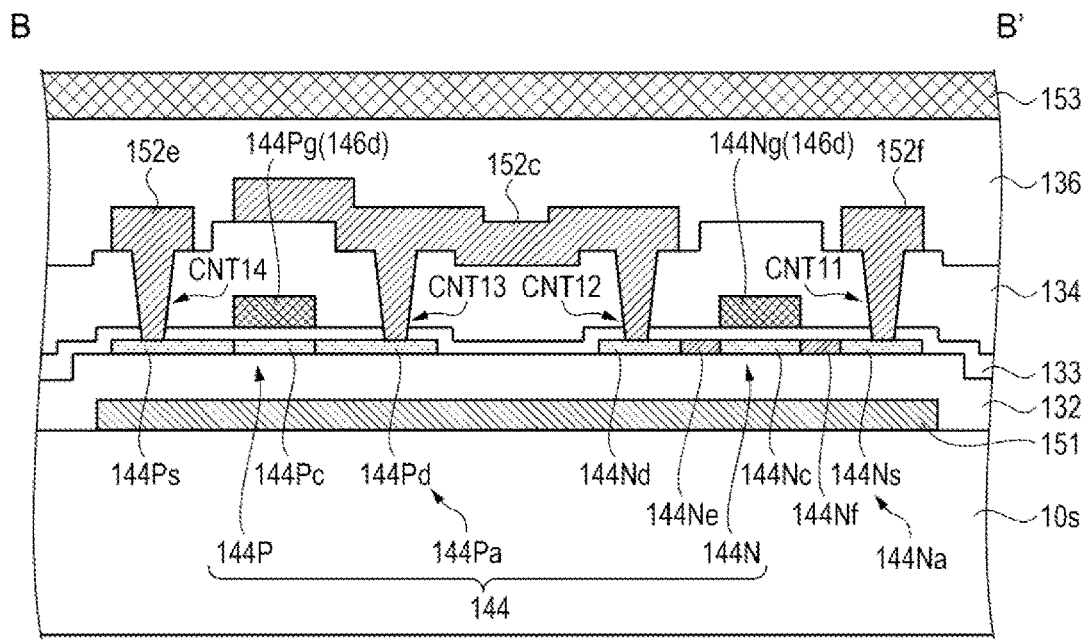
FIG. 10 is a cross-sectional view illustrating the structure of the shift register taken along line B-B' in FIG. 9.

FIG. 8 is a circuit diagram illustrating a configuration of the shift register, FIG. 9 a plan view illustrating an arrangement of each component of the shift register in the seal region, and FIG. 10 a cross-sectional view illustrating the structure of the shift register taken along the line B-B' in FIG. 9. Note that FIG. 8 illustrates the configuration of a shift register unit (unit) corresponding to one scan line 3. That is, the shift register 102A includes 1080 shift register units.

As illustrated in FIG. 8, the shift register unit 102AU of the shift register 102A of the present exemplary embodiment includes two N-type transistors 141 and 142 and two inverters (INV) 143 and 144. Each of the two INVs 143 and 144 is composed of, for example, a P-type transistor and an N-type transistor. INV 143 and INV 144 are electrically coupled in series to function as a memory element. The start pulse DY is coupled to IN of the shift register unit 102AU of the first stage in the shift register 102A. OUT of the first stage shift register unit 102AU is coupled to the IN of the shift register unit 102AU of the second stage. In a case where the configuration of the first stage of the shift register 102A is the shift register unit 102AU illustrated in FIG. 8, the configuration of the second stage is such that the clock signal CLK and its inverted signal CLKB are replaced and coupled in the shift register unit 102AU illustrated in FIG. 8. Next, similarly, while replacing the clock signals, a large number of shift register units 102AU are coupled to constitute the shift register 102A.

As illustrated in FIG. 9, in the seal region E3 outside the peripheral region E2 where the partition portion 21 is arranged, the two N-type transistors 141 and 142, INV 143, and INV 144 are each arranged in an island shape extending in the Y direction, and are arranged at intervals in the X direction. In addition, an island-shaped light-shielding layer 151 is arranged on the back side of each of the two N-type transistors 141 and 142, INV 143, and INV 144 so as to overlap each of them in plan view. Further, a light-shielding pattern 153 is arranged on the front side of each of the two N-type transistors 141 and 142, INV 143, and INV 144 so as to overlap each of them in plan view. Note that, in FIG. 9, the outline of the light-shielding pattern 153 is indicated by a dashed line for convenience of understanding the configuration of the lower layer. In the present exemplary embodiment, the power supply potential VSS is supplied to the light-shielding pattern 153 overlapping each of the two N-type transistors 141 and 142, INV 143 in plan view, and the power supply potential VDD is supplied to the light-shielding pattern 153 overlapping the INV 144 in plan view. That is, the light-shielding pattern 153 is a power supply wiring.

In the X direction outside the two N-type transistors 141 and 142, the two signal lines 145a and 145b extending in the Y direction are arranged at intervals in the X direction. The clock signal CLK is supplied to the signal line 145a, and the inverted clock signal CLKB is supplied to the signal line 145b.

The signal line 145a to which the clock signal CLK is supplied is connected to a gate of the N-type transistor 141 via a connection wiring 146a extending in the X direction. The signal line 145b to which the inverted clock signal CLKB is supplied is connected to a gate of the N-type transistor 142 via a connection wiring 146b also extending in the X direction. An input wiring 152a is connected to an input side of the N-type transistor 141. A connection wiring 152b is connected to an output side of the N-type transistor 141 and an output side of the N-type transistor 142.

INV 143 is composed of an N-type transistor 143N and a P-type transistor 143P. A gate of the N-type transistor 143N and a gate of the P-type transistor 143P are connected via a connection wiring 146c. The connection wiring 146c is electrically connected to the connection wiring 152b connected to the output side of the N-type transistor 141. The connection wiring 152b is arranged so as to overlap the connection wiring 146a and is connected to the connection wiring 146c. According to this, a pattern area ratio of each wiring decreases, and it is suitable for transmission of ultraviolet light (UV light) from a back surface. A connection wiring 152d is connected to the output side of the N-type transistor 143N of the INV 143 and the output side of the P-type transistor 143P.

The INV 144 is composed of an N-type transistor 144N and a P-type transistor 144P. A gate of the N-type transistor 144N and a gate of the P-type transistor 144P are connected via a connection wiring 146d. The connection wiring 146d is electrically connected to the connection wiring 152d connected to the output side of the N-type transistor 143N of the INV 143. The connection wiring 152d is arranged so as to overlap the connection wiring 146c and is connected to the connection wiring 146d. According to this, the pattern area ratio of each wiring decreases, and it is suitable for transmission of UV light from the back surface. A connection wiring 152c is connected to the output side of the N-type transistor 144N and the output side of the P-type transistor 144P of the INV 144. The connection wiring 152c is also electrically connected to the input side (OUT) of the N-type transistor 142. Note that the connection wiring 152c also functions as an output wiring.

A connection wiring 152e connected to the P-type transistor 143P of the INV 143 and the P-type transistor 144P of the INV 144 is connected to the light-shielding pattern 153 to which the power supply potential VDD is supplied by a contact hole CNT15 disposed on the P-type transistor 144P side. A connection wiring 152f connected to the N-type transistor 143N of the INV 143 and the N-type transistor 144N of the INV 144 is connected to the light-shielding pattern 153 to which the power supply potential VSS is supplied by a contact hole CNT16 disposed on the N-type transistor 143N side.

According to the shift register unit 102AU, a control signal related to switching control of the TFT 30 in the pixel circuit described above is supplied to the N-type transistor 141 via the input wiring 152a. When the start pulse DY is input to the scan line driving circuit 102, the two N-type transistors 141 and 142 are switching controlled by the clock signal CLK and the inverted clock signal CLKB, and the control signal is outputted to the output control circuit 102B in the subsequent stage via the INV 143 and the connection wiring 152c.

In FIG. 9, wirings hatched with the same pattern are formed in the same wiring layer on the base material 10s. Specifically, the connection wirings 146a, 146b, 146c, and 146d are formed in the same wiring layer. Further, the signal lines 145a and 145b, the input wiring 152a, the connection wiring 152b, 152c, 152d, 152e, and 152f are formed in the same wiring layer.

Next, the wiring structure of the shift register unit 102AU will be described by taking the INV 144 as an example. The line B-B' in FIG. 9 is a line segment crossing the INV 144 in the Y direction, and FIG. 10 is a cross-sectional view illustrating the wiring structure of the INV 144 on the base material 10s of the element substrate 10. Note that the same reference numerals are given to the same components as those of the latching circuit unit 101AU described previously, and a detailed description thereof will be omitted.

As illustrated in FIG. 10, a light-shielding layer 151 is formed on the transmissive base material 10s. The light-shielding layer 151 is formed by using a high melting point metal material as the same as that of the light-shielding layer 131 in the latching circuit unit 101AU is used, and in the present exemplary embodiment, The light-shielding layer 151 is formed by using tungsten silicide (WSi) having a low reflective property. The film thickness of the light-shielding layer 151 is, for example, 150 nm, as the same as the film thickness of the light-shielding layer 131. Note that the light-shielding layer 151 is formed in an island shape so as to overlap the INV 144 in plan view as described above by the photolithography method.

The first insulating film 132 is formed to cover the light-shielding layer 151. The first insulating film 132 is formed by using, for example, an NSG film or a silicon nitride film ($Si_xN_y$ film) which is not intentionally doped with impurities. The film thickness of the first insulating film 132 is, for example, 200 nm.

On the first insulating film 132, a semiconductor layer 144Na of the N-type transistor 144N and a semiconductor layer 144Pa of the P-type transistor 144P in the INV 144 are formed. The semiconductor layer 144Na includes a drain region 144Nd, a lightly doped drain region 144Ne, a channel region 144Nc, a lightly doped source region 144Nf, and a source region 144Ns, which are formed by selectively implanting N-type impurity ions into the polysilicon film. The semiconductor layer 144Pa includes a drain region 144Pd, a channel region 144Pc, and a source region 144Ps, which are formed by selectively implanting P-type impurity ions into the polysilicon film. The film thickness of each semiconductor layer 144Na, 144Pa is, for example, 50 nm.

Next, a gate insulating film 133 covering the semiconductor layer 144Na and the semiconductor layer 144Pa is formed. As described above, the gate insulating film 133 has a double-layer structure of a first silicon oxide film and a second silicon oxide film, and the film thickness of the gate insulating film 133 is, for example, 75 nm.

Next, on the gate insulating film 133, a gate electrode 144Ng is formed at a position facing the channel region 144Nc of the semiconductor layer 144Na. Further, a gate electrode 144Pg is formed at a position facing the channel region 144Pc of the semiconductor layer 144Pa. In the present exemplary embodiment, the gate electrodes 144Ng and 144Pg have a double-layer structure of a conductive polysilicon film and a tungsten silicide film. The film thickness of each of the gate electrodes 144Ng and 144Pg is, for example, 150 nm.

In addition, in the present exemplary embodiment, a part of the connection wiring 146d (see FIG. 9) functions as the gate electrode 144Ng and the gate electrode 144Pg.

Next, a second insulating film 134 covering the gate insulating film 133 and the gate electrodes 144Ng and 144Pg is formed. The second insulating film 134 is formed by using a silicon-based oxide film such as the aforementioned NSG film, PSG film, BSG film, BPSG film, or the like. The film thickness of the second insulating film 134 is, for example, 300 nm.

A total of four through holes are formed penetrating the second insulating film 134 and the gate insulating film 133 to reach the source region 144Ns, the drain region 144Nd of the semiconductor layer 144Na, the drain region 144Pd and the source region 144Ps of the semiconductor layer 144Pa. A conductive film is formed and patterned on the second insulating film 134 by covering at least the inner wall of the through holes or filling the through holes, whereby the connection wiring 152f electrically connected to a contact hole CNT11 and the source region 144Ns of the semiconductor layer 144Na via the contact hole CNT11 is formed. In addition, a connection wiring 152c electrically connected to the drain region 144Nd of the semiconductor layer 144Na via a contact hole CNT12 and electrically connected to the drain region 144Pd of the semiconductor layer 144Pa via a contact hole CNT13 is formed. Further, a connection wiring 152e electrically connected to a contact hole CNT14 and the source region 144Ps of the semiconductor layer 144Pa via the contact hole CNT14 is formed. The conductive films forming the connection wirings 152c, 152e, and 152f and the contact holes CNT11, CNT12, CNT13, and CNT14 may have a multilayer structure including a layer made of, for example, aluminum (Al) which is a low resistance metal, or titanium (Ti), titanium nitride (TiN), or the like. The thickness of a wiring layer including the connection wirings 152c, 152*e*, and 152*f* is, for example, 500 nm. The wiring layer is the same layer as the first wiring layer 135 described above.

Next, a third insulating film 136 covering the connection wiring 152*c*, 152*e*, and 152*f* is formed. As with the second insulating film 134, the third insulating film 136 is also formed by using a silicon-based oxide film such as an NSG film, a PSG film, a BSG film, or a BPSG film. The surface of the formed third insulating film 136 is affected by the wiring layer of the lower layer and unevenness occurs, thus the planarization processing such as CMP processing is performed on the surface of the third insulating film 136. The average film thickness of the third insulating film 136 after the planarization processing is, for example, 300 nm.

Next, a light-shielding pattern 153 is formed on the third insulating film 136. As with the connection wirings 152*c*, 152*e*, and 152*f*, the light-shielding pattern 153 may have a multilayer structure including a layer made of, for example, aluminum (Al) which is a low resistance metal, or titanium (Ti), titanium nitride (TiN), or the like. The film thickness of the light-shielding pattern 153 is, for example, 500 nm. The light-shielding pattern 153 is formed in the same layer as the second wiring layer 137 in the latching circuit unit 101AU described above.

In this manner, the data line driving circuit 101 including the first latching circuit 101A, the scan line driving circuit 102 including the shift register 102A, and the inspection circuit 103 are formed on the base material 10*s*. In addition, pixel circuits and external connection terminals 104, which are connected to these peripheral circuits, are formed.

Figure 11:
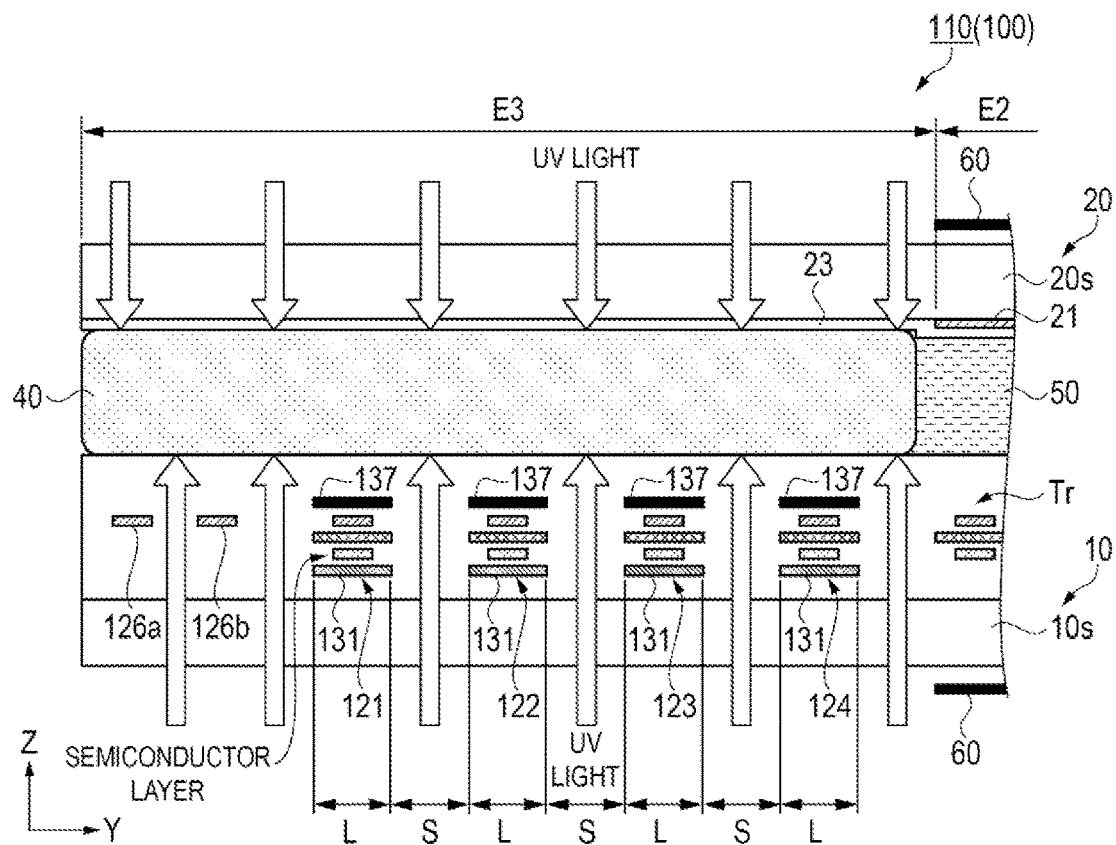
FIG. 11 is a schematic cross-sectional view illustrating a step of curing a seal material arranged between an element substrate and a counter substrate.

FIG. 11 is a schematic cross-sectional view illustrating a step of curing the seal material arranged between the element substrate and the counter substrate. Specifically, FIG. 11 illustrates a cross section taken along the Y direction of the portion where the latching circuit unit 101AU described above is arranged in the seal region E3.

A photo-curable adhesive is coated in a frame shape to the seal region E3 of the element substrate 10 on which the pixel circuit and the peripheral circuit are formed. A predetermined amount of liquid crystal is dropped on the inner side of the adhesive coated in the frame shape under a low pressure to bond the element substrate 10 and the counter substrate 20. By applying pressure and boding, the adhesive spreads into the seal region E3. As described above, since the spacer (not illustrated in FIG. 11) is included in the adhesive, the element substrate 10 and the counter substrate 20 are oppositely arranged at a predetermined interval as illustrated in FIG. 11. At this time, the predetermined interval, that is, the thickness of the adhesive is, for example, 1.5 μm to 3.0 μm.

As illustrated in FIG. 11, a mask 60 is arranged on both sides of the element substrate 10 and the counter substrate 20 oppositely arranged to prevent unnecessary ultraviolet rays (UV light) from being incident to the display region. The mask 60 is arranged to straddle the display region E1 and the peripheral region E2 where the partition portion 21 is disposed. Then, UV light is radiated from both the element substrate 10 side and the counter substrate 20 side to cure the photo-curable adhesive to form the seal material 40.

The counter electrode 23 made of a transparent conductive film is arranged in the seal region E3 of the counter substrate 20. Because the base material 20*s* and the counter electrode 23 transmit ultraviolet rays (UV light), the UV light radiated from the counter substrate 20 side reaches the adhesive without being shielded.

On the other hand, as described above, the latching circuit unit 101AU is arranged in the seal region E3 of the element substrate 10. The ASW 121, ASW 122, INV 123, INV 124 constituting the latching circuit unit 101AU are arranged at intervals in the Y direction. Each of the ASW 121, the ASW 122, the INV 123, and the INV 124, which include N-type and P-type transistors, is arranged between the light-shielding layer 131 and the light-shielding pattern 137 on the base material 10*s*. That is, each of the ASW 121, the ASW 122, the INV 123, and the INV 124 is shielded by the light-shielding layer 131 and the light-shielding pattern 137.

In the present exemplary embodiment, when the width of the light-shielding layer 131 in the Y direction is L, and the interval between the adjacent light-shielding layers 131 is S, L:S=1:1. Therefore, the UV light radiated from the element substrate 10 side passes through the interval S between the light-transmitting base material 10*s* and the adjacent light-shielding layers 131, and reaches the adhesive. In addition, even when the UV light is radiated from both the element substrate 10 side and the counter substrate 20 side, the light is shielded by the light-shielding layer 131 and the light-shielding pattern 137. Thus, the UV light is not radiated onto each of the ASW 121, ASW 122, INV 123, INV 124. That is, even if a part of the UV light is shielded by the latching circuit unit 101AU, UV light of a sufficient amount of light is made incident and the photo-curable adhesive is cured. On the other hand, no UV light is incident on the semiconductor layers of the N-type transistor and the P-type transistor constituting each of ASW 121, ASW 122, INV 123, INV 124. Thus, deterioration of the electric characteristics of these transistors due to radiation of UV light is prevented.

Note that, FIG. 11 illustrates a state of photo-curing of the seal material 40 in the seal region E3 where the latching circuit unit 101AU is arranged, which is the same as a state of the photo-curing of the seal material 40 in the seal region E3 where the shift register unit 102AU is disposed. Specifically, on the base material 10*s* of the element substrate 10, each of the two N-type transistors 141 and 142, INV 143, and INV 144 constituting the shift register unit 102AU is arranged between the light-shielding layer 151 and the light-shielding pattern 153, which are disposed in island shape. In the present exemplary embodiment, when the width of the light-shielding layer 151 in the Y direction is L, and the interval between the adjacent light-shielding layers 151 is S, L:S=1:1. When the thickness of the photo-curable adhesive is, for example, 1.5 μm to 3.0 μm as described above, from the viewpoint of promoting photo-curing of the adhesive, the interval S is preferably not less than the width L, and the interval S is preferably not less than 5 μm. In addition, from the viewpoint of arranging transistors and various wirings in the peripheral circuits, the width L is also preferably not less than 5 μm.

According to the liquid crystal device 100 of the first exemplary embodiment, the following effects can be achieved.

(1) A part of the peripheral circuit (first latching circuit 101A, shift register 102A) related to driving of the pixel circuit is arranged in the seal region E3 where the seal material 40 of the element substrate 10 is arranged. Therefore, as compared with a case where the seal region E3 having a predetermined width is ensured and a part of these peripheral circuits is arranged in the peripheral region E2 where the partition portion 21 is arranged, the outline of the element substrate 10 and the counter substrate 20 can be reduced in the X direction and the Y direction.

(2) The element substrate 10 and the counter substrate 20 are bonded together by the photo-curable type seal material 40. The semiconductor layer of the N-type or P-type transistor constituting a part of the peripheral circuits arranged in the seal region E3 is arranged between the light-shielding layer 131 and the light-shielding layer 151 arranged on the base material 10s at an interval S in the X direction or the Y direction. Therefore, even when ultraviolet light (UV light) is incident from the element substrate 10 side while photo-curing the seal material 40, the UV light passes through the base material 10s and the interval S. Thus, the seal material 40 can be sufficiently cured. Even if the UV light is incident from both the element substrate 10 side and the counter substrate 20 side, the UV light does not enter the semiconductor layer of the N-type or P-type transistor constituting a part of the peripheral circuit. That is, the deterioration of the electrical characteristics of these transistors due to radiation of UV light relating to photo-curing of the seal material 40 can be prevented.

Second Exemplary Embodiment

Next, an electro-optical device of the second exemplary embodiment will be described with reference to FIG. 12 and FIG. 13, taking a liquid crystal device as an example, as with the first exemplary embodiment. A liquid crystal device as the electro-optical device of the second exemplary embodiment is different from the liquid crystal device 100 of the first exemplary embodiment in the arrangement of the transistors constituting a part of the peripheral circuits arranged in the seal region E3.

Figure 12:
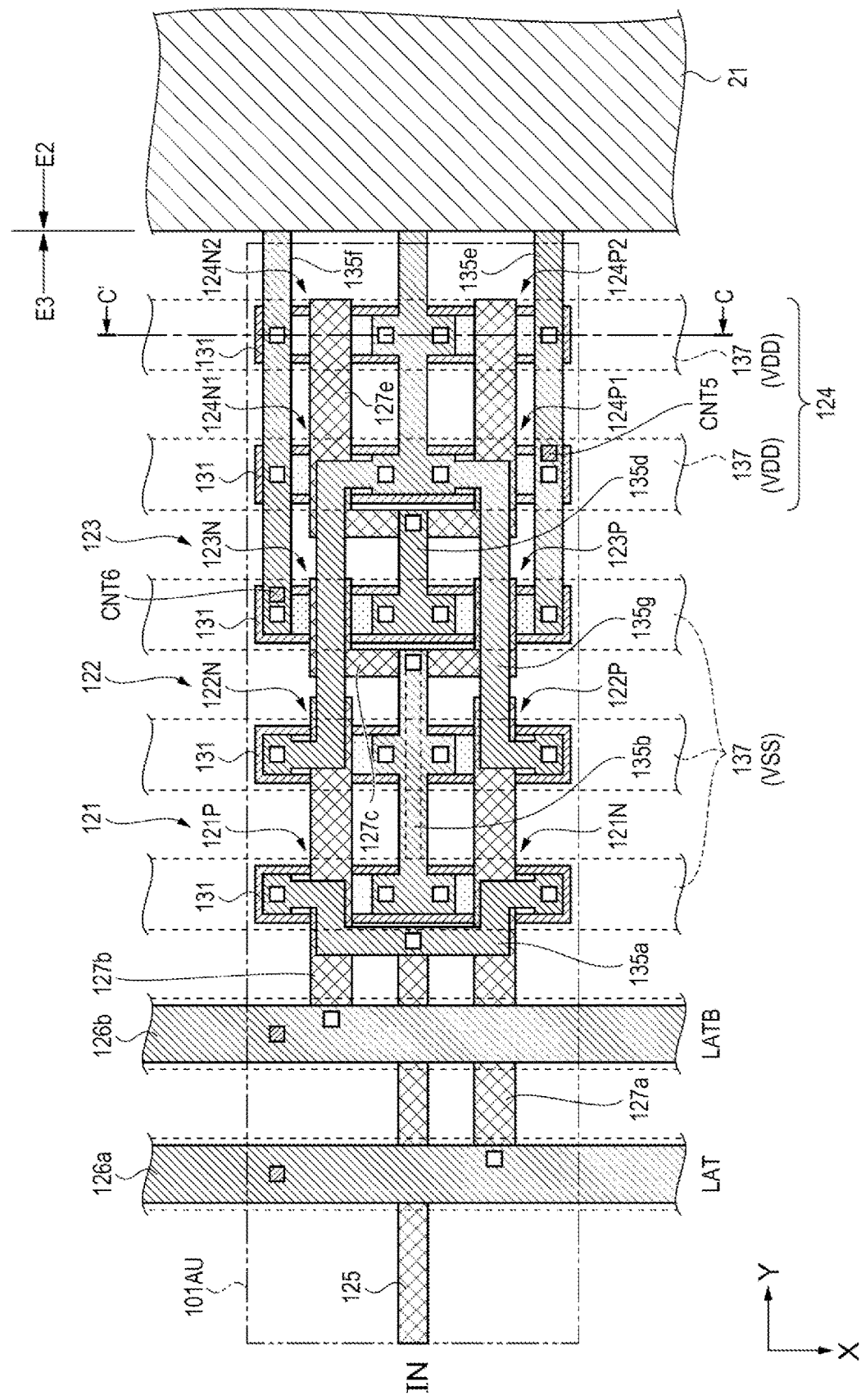
FIG. 12 is a plan view illustrating an arrangement of each component of the first latching circuit in the seal region of a second exemplary embodiment.
Figure 13:
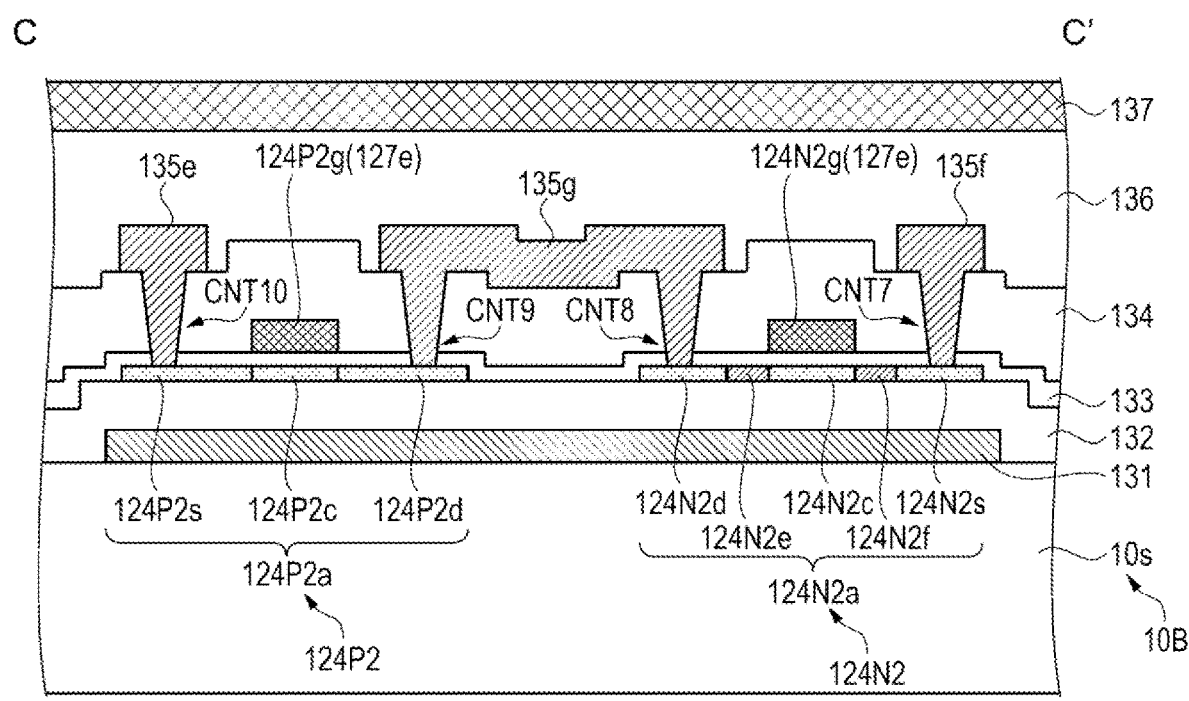
FIG. 13 is a cross-sectional view illustrating a structure of the first latching circuit taken along line C-C' in FIG. 12.

FIG. 12 is a plan view illustrating an arrangement of each component of the first latching circuit in the seal region of the second exemplary embodiment, and FIG. 13 is a cross-sectional view illustrating the structure of the first latching circuit taken along line C-C' in FIG. 12. Note that FIG. 12 illustrates the arrangement of each component in the latching circuit unit (unit) corresponding to one data line 6. In the liquid crystal device of the second exemplary embodiment, the same components as those of the liquid crystal device 100 of the first exemplary embodiment are denoted by the same reference numerals, and a detailed description thereof will be omitted.

A liquid crystal device 200 according to the second exemplary embodiment includes a liquid crystal layer 50 containing liquid crystals filled in an interval between an element substrate 10B and a counter substrate 20, which are bonded by a photo-curable type seal material 40. In a seal region E3 of the element substrate 10B, a first latching circuit 101A and a shift register 102A are arranged similarly to the element substrate 10 in the liquid crystal device 100 of the first exemplary embodiment. The circuit diagram of the latching circuit unit 101AU in the first latching circuit 101A is basically the same as that illustrated in FIG. 5 of the first exemplary embodiment. That is, as illustrated in FIG. 5, the latching circuit unit 101AU includes two analog switches (ASW) 121 and 122 and two inverters (INV) 123 and 124. Each of the two ASWs 121 and 122 is, for example, a transfer gate (transmission gate) including an N-type transistor and a P-type transistor. Each of the two INVs 123 and 124 is also composed of, for example, a P-type transistor and an N-type transistor. INV 123 and INV 124 are electrically connected in series to function as a memory element. However, in the second exemplary embodiment, the arrangement of the semiconductor layers of the transistors in the INV 124 is made different.

Specifically, as illustrated in FIG. 12, each of the ASW 121, the ASW 122, the INV 123, and the INV 124 is arranged in an island shape extending in the X direction and arranged at intervals in the Y direction in the seal region E3 outside a peripheral region E2 where a partition portion 21 is arranged. In addition, an island-shaped light-shielding layer 131 is arranged on the back side of each of the ASW 121, the ASW 122, the INV 123, and the INV 124 so as to overlap each of them in plan view. Further, a light-shielding pattern 137 is arranged on the front side of each of the ASW 121, the ASW 122, the INV 123, and the INV 124 so as to overlap each of them in plan view. Note that in FIG. 12, the outline of the light-shielding pattern 137 is indicated by a dashed line for convenience of understanding the configuration of the lower layer. A power supply potential VSS is supplied to the light-shielding pattern 137 overlapping each of the ASW 121, the ASW 122, and the INV 123 in plan view, and a power supply potential VDD is supplied to the light-shielding pattern 137 overlapping the INV 124 in plan view. That is, the light-shielding pattern 137 is a power supply wiring.

In the Y direction outside the ASW 121, two signal lines 126a and 126b extending in the X direction are arranged with an interval in the Y direction. A latch signal LAT is supplied to the signal line 126a, and an inverted latch signal LATB is supplied to the signal line 126b.

The arrangement of the input wirings 125, the connection wirings 127a, 127b, 127c, and the connection wirings 135a and 135b related to the electrical connection between the two signal lines 126a, 126b and the ASW 121, the ASW 122, the INV 123 is the same as that of the first exemplary embodiment.

In the present exemplary embodiment, the INV 124 includes an N-type transistor 124N1, a P-type transistor 124P1, an N-type transistor 124N2, and a P-type transistor 124P2 which are arranged on a lower side (a lower layer) of an adjacent light-shielding pattern 137. The N-type transistor 124N1 and the P-type transistor 124P1 are arranged along the X direction and are arranged adjacent to each other with an interval in the Y direction with respect to the INV 123. The N-type transistor 124N2 and the P-type transistor 124P2 are arranged along the X direction, and are arranged adjacent to each other at intervals in the Y direction with respect to the N-type transistor 124N1 and the P-type transistor 124P1.

Outputs of the N-type transistor 123N and the P-type transistor 123P of the INV 123 are connected to the gates of the N-type transistor 124N1 and the N-type transistor 124N2 of the INV 124 via the connection wiring 135d and a connection wiring 127e. Further, the connection wiring 127e is connected to the gates of the P-type transistor 124P1 and the P-type transistor 124P2. The inputs of the N-type transistor 122N and the P-type transistor 122P of the ASW 122 and the outputs of the two N-type transistors 124N1 and 124N2 and the two P-type transistors 124P1 and 124P2 of the INV 124 are connected by a connection wiring 135g, and the connection wiring 135g functions as an output wiring.

The connection wiring 135e connected to the P-type transistor 123P of the INV 123 and the two P-type transistors 124P1 and 124P2 of the INV 124 is connected to the light-shielding pattern 137 to which VDD is supplied by the contact hole CNT5 disposed on the P-type transistor 124P1 side. Further, the connection wiring 135f connected to the N-type transistor 123N of the INV 123 and the two N-type transistors 124N1 and 124N2 of the INV 124 is connected to the light-shielding pattern 137 to which VSS is supplied by the contact hole CNT6 disposed on the N-type transistor 123N side.

That is, the two N-type transistors 124N1 and 124N2 constituting the INV 124 are electrically connected in parallel and share the gate, source, and drain with each other. In other words, two N-type transistors 124N1 and 124N2 constitute one N-type transistor 124N, and the semiconductor layer is divided. The divided semiconductor layers are arranged on the lower side of the adjacent light-shielding patterns 137. Likewise, the two P-type transistors 124P1 and 124P2 constituting the INV 124 are electrically connected in parallel and share gates, sources, and drains with each other. In other words, two P-type transistors 124P1 and 124P2 constitute one P-type transistor 124P, and the semiconductor layer is divided. The divided semiconductor layers are arranged on the lower side of the adjacent light-shielding patterns 137.

Next, the wiring structure of the INV 124 will be described with reference to FIG. 13 taking the N-type transistor 124N2 and the P-type transistor 124P2 as an example. Note that the line C-C' in FIG. 12 is a line segment crossing the N-type transistor 124N2 and the P-type transistor 124P2 in the X direction.

As illustrated in FIG. 13, a light-shielding layer 131 made of, for example, tungsten silicide (WSi) which is a high melting point metal material is formed in an island shape on the base material 10s of the element substrate 10B. The film thickness of the light-shielding layer 131 is, for example, 150 nm. A first insulating film 132 made of, for example, an NSG film is formed to cover the light-shielding layer 131. The film thickness of the first insulating film 132 is, for example, 200 nm. A semiconductor layer 124N2a of the N-type transistor 124N2 and a semiconductor layer 124P2a of the P-type transistor 124P2 in the INV 124 are formed on the first insulating film 132. The semiconductor layer 124N2a includes a drain region 124N2d, a lightly doped drain region 124N2e, a channel region 124N2c, a lightly doped source region 124N2f, and a source region 124N2s, which are formed by selectively implanting N-type impurity ions into the polysilicon film. The semiconductor layer 124P2a includes a drain region 124P2d, a channel region 124P2c, and a source region 124P2s, which are formed by selectively implanting P-type impurity ions into the polysilicon film. The thickness of each semiconductor layer 124N2a and 124P2a is, for example, 50 nm.

Next, agate insulating film 133 covering the semiconductor layer 124N2a and the semiconductor layer 124P2a is formed. On the gate insulating film 133, a gate electrode 124N2g is formed at a position facing the channel region 124N2c of the semiconductor layer 124N2a. Further, a gate electrode 124P2g is formed at a position facing the channel region 124P2c of the semiconductor layer 124P2a. In the present exemplary embodiment, the gate electrodes 124N2g and 124P2g have a double-layer structure of a conductive polysilicon film and a tungsten silicide film. The thickness of each of the gate electrodes 124N2g and 124P2g is, for example, 150 nm.

Further, in the present exemplary embodiment, apart of the connection wiring 127e (see FIG. 12) functions as the gate electrode 124N2g, and the gate electrode 124P2g.

Next, a second insulating film 134 covering the gate insulating film 133 and the gate electrodes 124N2g and 124P2g is formed. The second insulating film 134 is formed by using a silicon-based oxide film such as the aforementioned NSG film, PSG film, BSG film, BPSG film, or the like. The film thickness of the second insulating film 134 is, for example, 300 nm.

A total of four through holes are formed penetrating the second insulating film 134 and the gate insulating film 133 to reach the source region 124N2s, the drain region 124N2d of the semiconductor layer 124N2a, and the drain region 124P2d, the source region 124P2s of the semiconductor layer 124P2a. By forming and patterning a conductive film on the second insulating film 134 so as to cover at least the inner walls of these through holes or to fill the through holes, the connection wiring 135f electrically connected to the source region 124N2s of the semiconductor layer 124N2a via a contact hole CNT7 is formed. Further, the connection wiring 135g electrically connected to the drain region 124N2d of the semiconductor layer 124N2a via a contact hole CNT8 and electrically connected to the drain region 124P2d of the semiconductor layer 124P2a via a contact hole CNT9 is formed. In addition, the contact hole CNT10 and the connection wiring 135e electrically connected to the source region 124P2s of the semiconductor layer 124P2a via the contact hole CNT10 are formed. The conductive film forming the connection wirings 135e, 135f, 135g, and the contact holes CNT7, CNT8, CNT9, CNT10 may have a multilayer structure including a layer made of, for example, aluminum (Al) which is a low resistance metal, or titanium (Ti), titanium nitride (TiN), or the like. The thickness of the first wiring layer 135 including the connection wirings 135e, 135f, 135g is, for example, 500 nm.

Next, a third insulating film 136 covering the connection wirings 135e, 135f, 135g is formed. As the second insulating film 134, the third insulating film 136 is also formed by using a silicon-based oxide film such as an NSG film, a PSG film, a BSG film, or a BPSG film. Unevenness occurs on the surface of the formed third insulating film 136 under the influence of the wiring layer of the lower layer. Thus, the planarization processing such as CMP processing is performed on the surface of the third insulating film 136. The average film thickness of the third insulating film 136 after the planarization processing is, for example, 300 nm.

Next, a light-shielding pattern 137 is formed on the third insulating film 136. The light-shielding pattern 137 may be a multilayer structure including a layer made of, for example, aluminum (Al) which is a low resistance metal, or titanium (Ti), titanium nitride (TiN), or the like, similarly to the connection wirings 135e, 135f, and 135g. The film thickness of the light-shielding pattern 137 is, for example, 500 nm.

According to the configuration of the element substrate 10B in the liquid crystal device 200 of the second exemplary embodiment, the same effects as those of the effects (1) and (2) of the liquid crystal device 100 of the first exemplary embodiment can be achieved. In addition, both the semiconductor layers of the N-type transistor 124N and the P-type transistor 124P constituting the INV 124 are divided and arranged on the lower side (lower layer) of the light-shielding pattern 137. Therefore, a circuit having a large driving capability of the INV 124 can be configured, as compared with the first exemplary embodiment in which the semiconductor layer is not divided. In FIG. 12, it is applied to the INV 124, but it may be applied to the analog switches (ASW) 121 and 122, and INV 123 in the same manner. Thus, for example, the first latching circuit 101A corresponding to high-speed driving can be achieved.

Note that the structure for dividing the semiconductor layer of the transistor arranged on the lower side (the lower layer) of the light-shielding pattern 137 is applied not only to the first latching circuit 101A (latching circuit unit 101AU), but also to the shift register 102A (shift register unit 102AU). In other words, even when the semiconductor layers of the transistors are arranged on the lower side (the lower layer) of the light-shielding pattern 153 of the shift register unit 102AU, the same effects can be achieved.

In the liquid crystal device 100 of the first exemplary embodiment and the liquid crystal device 200 of the second exemplary embodiment, a part of the peripheral circuits arranged in the seal region E3 of the element substrate 10

(element substrate 10B) is not limited to being both of the first latching circuit 101A and the shift register 102A, but may be either one of them. According to this, the lengths in the X direction and the Y direction of the outline of the element substrate 10 (the element substrate 10B) can be reduced. If the outline of the element substrate 10 (the element substrate 10B) becomes smaller, the outline of the counter substrate 20 can also be made smaller.

From the viewpoint of reducing the outline of the element substrate 10 (the element substrate 10B), the semiconductor layer of at least one transistor included in a part of the peripheral circuits in the seal region E3 may be arranged so as to overlap one of a plurality of light-shielding patterns arranged at intervals in plan view. In other words, by arranging a part of the peripheral circuits in the seal region E3, while securing the seal region E3 of a predetermined width, corresponding to the number of the transistors arranged on the lower side (lower layer) of the plurality of the light-shielding patterns, the width of the peripheral region E2 in which the peripheral circuit is arranged can be reduced.

The liquid crystal device 100 of the first exemplary embodiment and the liquid crystal device 200 of the second exemplary embodiment are micro display suitably used as a light valve (light modulation member) of a projection type display device described later. Therefore, the element substrate 10 (element substrate 10B) is manufactured in a state in which a plurality of element substrates 10 (element substrate 10B) are laid out on the mother substrate. Even if the size of the display region E1 is the same, if the outline of the element substrate 10 (the element substrate 10B) is reduced, the number of element substrates 10 (element substrates 10B) that can be laid out on the mother substrate increases, productivity in manufacturing can be improved, and the cost of the liquid crystal device 100 (liquid crystal device 200) can be reduced.

Third Exemplary Embodiment

Electronic Apparatus

Figure 14:
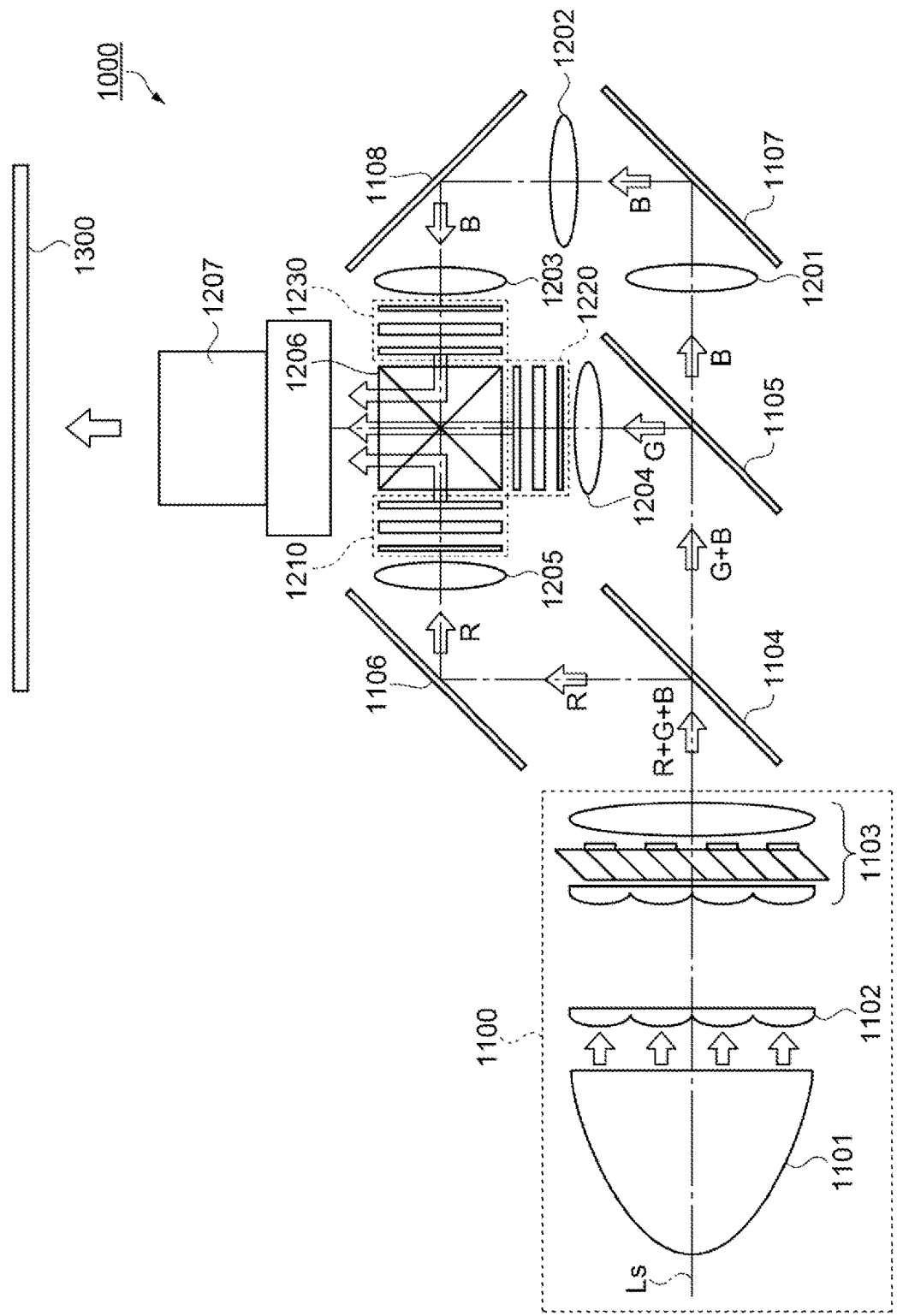
FIG. 14 is a schematic view illustrating a configuration of a projection-type display apparatus as an electronic apparatus according to a third exemplary embodiment.

Next, a projection-type display apparatus to which the liquid crystal device according to the present exemplary embodiment is applied. FIG. 14 is a schematic view illustrating a configuration of the projection-type display apparatus as an electronic apparatus according to third exemplary embodiment.

As illustrated in FIG. 14, a projection-type display apparatus 1000 as an electronic apparatus of the present exemplary embodiment includes a polarized light illumination apparatus 1100 arranged along a system optical axis Ls, two dichroic mirrors 1104 serving as a light-separating element, three reflection mirrors 1106, 1107 and 1108, five relay lenses 1201, 1202, 1203, 1204 and 1205, three transmission-type liquid crystal light valves 1210, 1220 and 1230 serving as light modulation members, a cross dichroic prism 1206 serving as a photosynthetic element, and a projection lens 1207.

The polarized light illumination apparatus 1100 is generally includes a lamp unit 1101 as a light source including a white light source such as an extra-high pressure mercury lamp or a halogen lamp, an integrator lens 1102, and a polarization conversion element 1103.

The dichroic mirror 1104 reflects red light (R) of a polarized light flux emitted from the polarized light illumination apparatus 1100, and transmits green light (G) and blue light (B). The other dichroic mirror 1105 reflects the green light (G) transmitted by the dichroic mirror 1104, and transmits the blue light (B).

The red light (R) reflected by the dichroic mirror 1104 is reflected by the reflection mirror 1106 and subsequently is incident on the liquid crystal light valve 1210 via the relay lens 1205.

The green light (G) reflected by the dichroic mirror 1105 is incident on the liquid crystal light valve 1220 via the relay lens 1204.

The blue light (B) transmitted by the dichroic mirror 1105 is incident on the liquid crystal light valve 1230 via a light guide system including three relay lenses 1201, 1202 and 1203, and two reflection mirrors 1107 and 1108.

Each of the liquid crystal light valves 1210, 1220, and 1230 is arranged to face an incident surface of each type of color light of the cross dichroic prism 1206. The color light incident on the liquid crystal light valves 1210, 1220, and 1230 is modulated based on video information (video signal) and is emitted toward the cross dichroic prism 1206. In this prism, four rectangular prisms are bonded together, and on inner surfaces of the prisms, a dielectric multilayer film configured to reflect red light and a dielectric multilayer film configured to reflect blue light are formed in a cross shape. Three types of color light are synthesized by these dielectric multilayer films, and light representing a color image is synthesized. The synthesized light is projected onto a screen 1300 by the projection lens 1207 as a projection optical system, and an image is enlarged and displayed.

The liquid crystal light valve 1210 is a bulb to which the liquid crystal device 100 (see FIG. 1) of the first exemplary embodiment is applied. A pair of polarizing elements, which are arranged in a crossed Nicol state is arranged on the incident side and the emitting side of the color light of the liquid crystal device 100 with a gap interposed between the pair of light-polarizing elements. The same applies to the other liquid crystal light valves 1220 and 1230.

According to the projection-type display apparatus 1000, the liquid crystal device 100 is used as the liquid crystal light valves 1210, 1220 and 1230, the projection-type display apparatus 1000 having excellent display quality and cost performance can be provided. Note that, even when the liquid crystal device 200 of the second exemplary embodiment used as the liquid crystal light valves 1210, 1220 and 1230, the same effect can be achieved. Further, the light source is not limited to a white light source, and an LED or a laser light source corresponding to red light (R), green light (G), and blue light (B) may be used.

The disclosure is not limited to the exemplary embodiments described above, and various modifications and improvements may be added to the exemplary embodiments described above. Such modified examples are described below.

Modified Example 1

In the base material 10s of the element substrate 10 (element substrate 10B) and the base material 20s of the counter substrate 20, in a case where at least the base material 20s is light-transmissive, ultraviolet rays (UV light) can be incident from the counter substrate 20 side to cure the photo-curable type seal material 40. Also in this case, the outline of the element substrate 10 (element substrate 10B) can be reduced by arranging a part of the peripheral circuits in the seal region E3 of the element substrate 10 (element substrate 10B). In addition, by arranging the transistors included in a part of the peripheral circuits on the lower side (the lower layer) of the light-shielding pattern, ultraviolet rays (UV light) incident on the semiconductor layer of the transistor can be shielded by the light-shielding pattern.

Modified Example 2

As described in the second exemplary embodiment, the configuration in which the semiconductor layers of the transistors constituting a part of the peripheral circuits arranged in the seal region E3 are divided and arranged is not limited to being arranged on the lower side (the lower layer) of adjacent light-shielding patterns, and for example, all or part of the semiconductor layers divided may be arranged on the lower side of one light-shielding pattern. According to this, the number of the plurality of the light-shielding patterns can be reduced, and the lengths in the X direction and the Y direction of the element substrate in which the plurality of light-shielding patterns are disposed can be reduced.

Modified Example 3

The plurality of the light-shielding patterns 137 and the light-shielding patterns 153 are not limited to being all power supply wirings, as long as one of them is a power supply wiring. Further, at least one of the plurality of the light-shielding patterns 137 and the light-shielding patterns 153 may be a common potential wiring 107 for supplying the common potential (LCCOM) to the counter electrode 23 which is the common electrode of the counter substrate 20. In this case, the stabilization of the common potential necessary for driving the pixel P can be strengthened, and the display quality can be improved. In the case of high-speed driving, in order to reduce a parasitic capacitance serving as a driving load of a high-speed signal system, the light-shielding pattern may be formed in a floating isolated island shape instead of a continuous wiring shape. For example, in FIG. 6 of the first exemplary embodiment, the light-shielding pattern 137 overlapping the analog switches 121 and 122 of the first latching circuit unit 101AU is strongly capacitively coupled with the latch signal LAT or inverted latch signal LATB under high speed driving. Here, when the light-shielding pattern 137 is set not to connect with the power supply potential VSS and divided into island shape for each semiconductor layer to be floating, the configuration is suitable for high-speed driving.

Modified Example 4

The electro-optical device to which the present disclosure can be applied is not limited to the transmission-type liquid crystal devices 100 and 200, but can also be applied to a reflection-type liquid crystal device. Further, the present disclosure is not limited to the liquid crystal device, but can also be applied to, for example, an active drive type light emitting device including a light emitting element and a pixel circuit related to driving the light emitting element in the pixel.

Modified Example 5

The electronic apparatus to which the liquid crystal devices 100 and 200 of the exemplary embodiments described above can be applied is not limited to the projection-type display apparatus 1000 of the third exemplary embodiment. For example, by adopting a configuration in which a color filter including a colored layer in a pixel as a liquid crystal device, the liquid crystal device can be used suitably as, for example, a display unit of a projection-type Head-Up Display (HUD), a direct view-type Head-Mounted Display (HMD), an electronic book, a personal computer, a digital still camera, a liquid crystal television, a view finder-type or direct view-type video recorder, a car navigation system, an electronic notebook, an information terminal device such as a POS, or the like.

Modified Example 6

The plurality of the light-shielding patterns 137 are not limited to being separated so as to be adjacent to each other, and the adjacent light-shielding patterns 137 may be entirely connected to each other. For example, a transmissive portion that transmits UV light may be disposed in a part of one light-shielding pattern that is connected. In addition, a part of the plurality of the light-shielding patterns 137 may be connected partially. The same applies to the light-shielding pattern 153.

Contents derived from the exemplary embodiments described above will be described below.

An electro-optical device according to an aspect of the present disclosure is an electro-optical device in which an electro-optical element is disposed between a first substrate and a second substrate which are oppositely arranged via a photo-curable type seal material, wherein at least the second substrate is light transmissive and includes a light-shielding pattern in a part of a seal region of the first substrate where the seal material is disposed, and a semiconductor layer of a transistor included in a driving circuit for driving the electro-optical element is arranged so as to overlap with the light-shielding pattern in plan view.

According to the present disclosure, even if a predetermined width is secured for the seal region in which the photo-curable type seal material is arranged, the semiconductor layer of the transistor included in the driving circuit for driving the electro-optical element can be arranged in the seal region, and a frame region including the seal region in the electro-optical device can be made smaller than the related art. In addition, the semiconductor layer is arranged to overlap the light-shielding pattern in plan view, thus light for curing the photo-curable type seal material can be prevented from being incident in the semiconductor layer by the light-shielding pattern. That is, it is capable of preventing the property of the semiconductor layer from changing and deteriorating the characteristics of the transistor due to the incidence of light. That is, even when a photo-curable type seal material is adopted, by arranging the semiconductor layer of at least one transistor related to the driving circuit of the electro-optical element in the seal region, an electro-optical device capable of realizing miniaturization can be provided.

In the electro-optical device described above, it is preferable that the first substrate and the second substrate be light transmissive, and that the semiconductor layer be arranged between the light-shielding pattern and a light-shielding layer disposed in an island-shape on the first substrate.

According to this configuration, even when light for curing the photo-curable type seal material is made incident from both the first substrate and the second substrate, the light can be prevented from being incident on the semiconductor layer by the light-shielding layer and the light-shielding pattern.

In the electro-optical device described above, the transistor may include two transistors coupled in parallel.

According to this configuration, a driving circuit having a large driving capability can be configured. In other words, an electro-optical device, which has a small size and includes a transistor including a semiconductor layer capable of corresponding to a digital circuit requiring high-speed driving, can be realized.

In addition, in the electro-optical device described above, the light-shielding pattern may include a plurality of light-shielding patterns arranged at intervals in plan view, the semiconductor layer in one of the two transistors coupled in parallel may be arranged on the first substrate so as to overlap with one of two adjacent light-shielding patterns among the plurality of the light-shielding patterns in plan view, the semiconductor layer in the other of the two transistors coupled in parallel may be arranged on the first substrate so as to overlap with the other of the two adjacent light-shielding patterns in plan view.

According to this configuration, light can be prevented from being incident on each of the semiconductor layers coupled in parallel by adjacent light-shielding patterns.

In the electro-optical device described above, the light-shielding pattern is a power supply wiring.

According to this configuration, the light can be prevented from being incident on the semiconductor layer of the transistor by the power supply wiring. In addition, the electric power necessary for the driving circuit can be supplied.

In the electro-optical device described above, the electro-optical element may be a liquid crystal element, which includes a pixel electrode disposed for each pixel on the first substrate and a common electrode disposed on the second substrate, and supplied with a common potential, and the light-shielding pattern may be a common potential wiring.

According to this configuration, light can be prevented from being incident on the semiconductor layer of the transistor by the common potential wiring. In addition, the stabilization of the common potential necessary for driving the pixels can be strengthened.

An electronic apparatus of the present disclosure includes the electro-optical device described above.

According to the present disclosure, the size of the electro-optical device can be reduced, and an electronic apparatus having excellent cost performance can be provided.

What is claimed is:

1. An electro-optical device comprising:
   a photo-curable type seal material;
   a first transistor disposed at a position that overlaps the photo-curable type seal material;
   a second transistor disposed at a position that overlaps the photo-curable type seal material;
   a third transistor disposed at a position that overlaps the photo-curable type seal material;
   a fourth transistor disposed at a position that overlaps the photo-curable type seal material;
   a fifth transistor disposed at a position that overlaps the photo-curable type seal material;
   a sixth transistor disposed at a position that overlaps the photo-curable type seal material;
   a first wiring layer disposed between the first transistor and the photo-curable type seal material in a thickness direction of the photo-curable type seal material and is disposed between the second transistor and the photo-curable type seal material in the thickness direction;
   a second wiring layer disposed between the third transistor and the photo-curable type seal material in the thickness direction and is disposed between the fourth transistor and the photo-curable type seal material in the thickness direction; and
   a third wiring layer disposed between the fifth transistor and the photo-curable type seal material in the thickness direction and is disposed between the sixth transistor and the photo-curable type seal material in the thickness direction, wherein
   the first transistor and the second transistor are arranged along a first direction,
   the first transistor, the third transistor and the fifth transistor are arranged along a second direction that intersects the first direction in plan view,
   the third transistor and the fourth transistor are arranged along the first direction,
   the second transistor, the fourth transistor and the sixth transistor are arranged along the second direction,
   the fifth transistor and the sixth transistor are arranged along the first direction,
   the first wiring layer is extend along the first direction in plan view,
   the second wiring layer is extend along the second direction in plan view, and
   the third wiring layer is extend along the second direction in plan view.

2. The electro-optical device according to claim 1, wherein
   the first transistor and the second transistor does not electrically connect the first wiring layer.

3. The electro-optical device according to claim 1, wherein
   the third transistor, the fourth transistor, the fifth transistor and the sixth transistor are a length of the first direction longer than a length of the second direction.

4. The electro-optical device according to claim 1, wherein
   an interval between the first wiring layer and the second wiring layer is larger than a width of the first wiring layer in the second direction, and
   an interval between the second wiring layer and the third wiring layer is larger than the width of the first wiring layer in the second direction.

5. The electro-optical device according to claim 1, wherein
   a channel length of the first transistor, a channel length of the second transistor, a channel length of the third transistor, a channel length of the fourth transistor, a channel length of the fifth transistor and a channel length of the sixth transistor are arranged along a same direction.

6. The electro-optical device according to claim 1, wherein
   a width of the second wiring layer in the second direction is equal to a width of the first wiring layer in the second direction, and
   a width of the third wiring layer in the second direction is equal to the width of the first wiring layer in the second direction.

7. An electronic apparatus comprising the electro-optical device according to claim 1.

* * * * *